US011327086B2

(12) United States Patent
Nose et al.

(10) Patent No.: US 11,327,086 B2
(45) Date of Patent: May 10, 2022

(54) SAMPLE MEASURING METHOD AND SAMPLE MEASUREMENT DEVICE

(71) Applicant: SYSMEX CORPORATION, Kobe (JP)

(72) Inventors: Tomoyuki Nose, Kobe (JP); Sayuri Tomoda, Kobe (JP); Yusuke Miida, Kobe (JP); Kazuyoshi Horii, Kobe (JP); Kenichiro Suzuki, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 350 days.

(21) Appl. No.: 16/205,371

(22) Filed: Nov. 30, 2018

(65) Prior Publication Data

US 2019/0162740 A1 May 30, 2019

(30) Foreign Application Priority Data

Nov. 30, 2017 (JP) ............................ JP2017-231146

(51) Int. Cl.
*G01N 35/00* (2006.01)
*G01N 35/10* (2006.01)

(52) U.S. Cl.
CPC . *G01N 35/00732* (2013.01); *G01N 35/00069* (2013.01); *G01N 35/00693* (2013.01); *G01N 35/1002* (2013.01); *G01N 35/00029* (2013.01); *G01N 35/0098* (2013.01); *G01N 2035/00574* (2013.01); *G01N 2035/00801* (2013.01); *G01N 2035/00851* (2013.01)

(58) Field of Classification Search
CPC ....... G01N 35/00693; G01N 35/00069; G01N 35/00584; G01N 35/00732
See application file for complete search history.

(56) References Cited

U.S. PATENT DOCUMENTS

| | | | | |
|---|---|---|---|---|
| 2006/0066850 | A1 * | 3/2006 | Kimura | G01J 3/10 356/328 |
| 2009/0047713 | A1 | 2/2009 | Handique | |
| 2009/0163367 | A1 * | 6/2009 | Yoo | G01N 35/00069 506/7 |
| 2010/0288830 | A1 | 11/2010 | Watari | |

(Continued)

FOREIGN PATENT DOCUMENTS

| | | | |
|---|---|---|---|
| CN | 105606608 | A | 5/2016 |
| CN | 106596888 | A | 4/2017 |

(Continued)

OTHER PUBLICATIONS

Extended European search report ("EESR") dated May 6, 2019 in a counterpart European patent application.

(Continued)

*Primary Examiner* — Walter L Lindsay, Jr.
*Assistant Examiner* — Andrew V Do
(74) *Attorney, Agent, or Firm* — Metrolex IP Law Group, PLLC

(57) ABSTRACT

A sample measuring method of optically measuring a sample housed in a container in a sample measurement device, the method including: loading the container such that the container is shielded from light; starting to read information regarding a measurement to be performed on the sample in response to the loading the container; and measuring the sample based on the read information.

13 Claims, 19 Drawing Sheets

(56) References Cited

U.S. PATENT DOCUMENTS

| | | | | |
|---|---|---|---|---|
| 2013/0125628 | A1 | 5/2013 | Kitagawa et al. | |
| 2013/0162981 | A1 | 6/2013 | Emeric et al. | |
| 2014/0295453 | A1* | 10/2014 | Hirata | G01N 33/5302 435/7.1 |
| 2015/0057962 | A1 | 2/2015 | Morita | |
| 2015/0272689 | A1 | 10/2015 | Shin et al. | |
| 2016/0054342 | A1 | 2/2016 | Son et al. | |
| 2016/0187363 | A1* | 6/2016 | Kim | B01L 3/5027 435/3 |
| 2018/0095069 | A1* | 4/2018 | Hwang | G01N 35/00594 |

FOREIGN PATENT DOCUMENTS

| | | | | |
|---|---|---|---|---|
| CN | 206074624 | U | 4/2017 | |
| CN | 107037223 | A | 8/2017 | |
| CN | 107192835 | A | 9/2017 | |
| JP | H02-158890 | A | 6/1990 | |
| JP | 2000-310644 | A | 11/2000 | |
| JP | 2005-300292 | A | 10/2005 | |
| JP | 2005-321383 | A | 11/2005 | |
| JP | 2009-109410 | A | 5/2009 | |
| JP | 2010-008100 | A | 1/2010 | |
| JP | 2011-027731 | A | 2/2011 | |
| JP | 2011-232205 | A | 11/2011 | |
| JP | 2012-168038 | A | 9/2012 | |
| JP | 2012-522450 | A | 9/2012 | |
| JP | 2014-066540 | A | 4/2014 | |
| JP | 2014-066607 | A | 4/2014 | |
| JP | 2015042954 | A * | 3/2015 | G01N 21/01 |
| JP | 2016-512332 | A | 4/2016 | |
| JP | 2017-184737 | A | 10/2017 | |

OTHER PUBLICATIONS

Chinese Office Action dated Feb. 7, 2021 in a counterpart Chinese patent application.

Office Action (JPOA) dated Jun. 29, 2021 in a related Japanese patent application.

Office Action (JPOA) dated Oct. 12, 2021 in a counterpart Japanese patent application.

Office Action (CNOA) dated Dec. 1, 2021 in a counterpart Chinese patent application.

Office Action (JPOA) dated Mar. 8, 2022 in a counterpart Japanese patent application.

* cited by examiner

SAMPLE MEASURING METHOD AND SAMPLE MEASUREMENT DEVICE

CROSS REFERENCE TO RELATED APPLICATION

This application claims priority based on 35 USC 119 from prior Japanese Patent Application No. 2017-231146 filed on Nov. 30, 2017, entitled "SAMPLE MEASURING METHOD AND SAMPLE MEASURMENT DEVICE", the entire contents of which are incorporated herein by reference.

BACKGROUND

The disclosure relates to a sample measuring method and a sample measurement device for measuring a sample.

As disclosed in U.S. Patent Application Publication No. 2016/0054342 ("Patent Literature 1"), a sample measurement device 900 includes a display screen 901 as illustrated in FIG. 27. The sample measurement device 900 includes a loader 902 provided with a load section 903 onto which a disk-shaped cartridge (not illustrated) is loaded. The display screen 901 includes a touch panel, and can receive an input operation through a user interface screen including buttons 904. Through the user interface screen, information such as the race, sex, age, height, and weight of a subject is inputted. When a user of the sample measurement device 900 operates the buttons 904 displayed on the display screen 901 after completion of the input of various kinds of information, the loader 902 is moved out of the device 900. The user loads a cartridge with a blood sample injected therein in the load section 903 of the loader 902 moved out of the device, and operates the buttons 904 displayed on the display screen 901 after sending the loader 902 into the device 900. Upon receipt of an input operation through the buttons 904, the sample measurement device 900 starts a sample measurement operation using the cartridge.

The sample measurement device disclosed in Patent Literature 1 is a small-sized measurement device for what is called point of care (PoC) testing. The sample measurement device for PoC is mainly used at a small clinic unlike a large-sized measurement device used by a professional laboratory technician at a medical facility provided with a laboratory. Therefore, the sample measurement device for PoC is expected to be operated by staff other than the professional laboratory technician or by a patient himself/herself. Thus, it is desired that measurement be performed with a simple operation. However, in Patent Literature 1, the measurement can be started only after the input of various kinds of information. Thus, input operation of various kinds of information is required to be performed on the user interface screen. Therefore, a cumbersome input operation is required every time measurement is performed. Moreover, an operation mistake is likely to occur until the user becomes familiar with operations on the user interface screen.

The disclosure is intended to enable measurement to be started with a simpler operation.

SUMMARY

In accordance with one or more embodiments, a sample measuring method of optically measuring a sample housed in a container in a sample measurement device, the method including: loading the container such that the container is shielded from light; starting to read information regarding a measurement to be performed on the sample in response to the loading the container; and measuring the sample based on the read information.

In accordance with one or more embodiments, a sample measurement device that optically measures a sample housed in a container, including: a housing; a load section that enables to load the container including an information storage part with information recorded therein; a reader that reads information regarding a measurement to be performed on the sample in response to the loading the container; a measurement unit that measures the sample; a mechanical unit that is movable for the container loaded by the load section to be shielded from light; a detecting unit that detects that the container is loaded to be shielded from light; and a control unit that controls the reader and the measurement unit in response to detection by the detecting unit.

DETAILED DESCRIPTION

Figure 1:
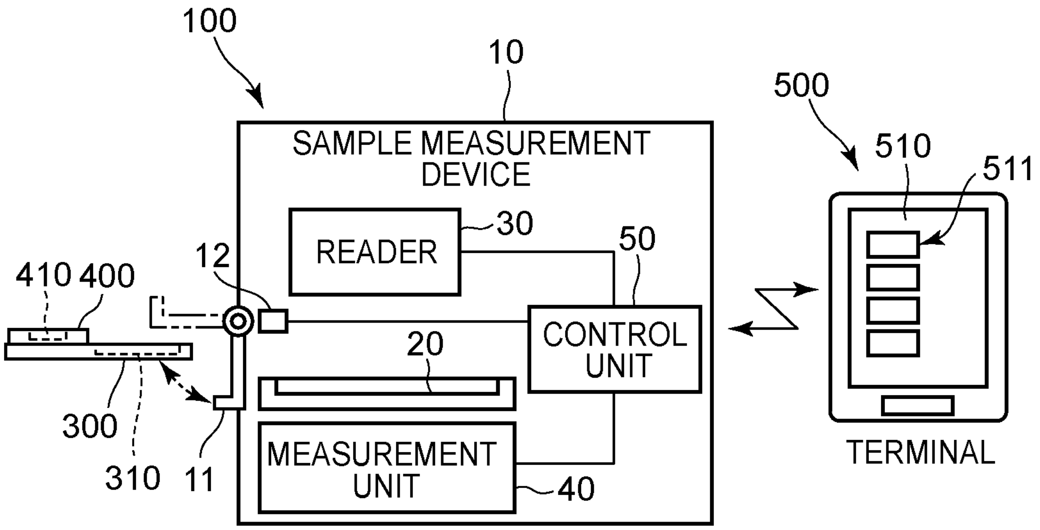
FIG. 1 is a schematic view illustrating a sample measurement device according to one or more embodiments.

Embodiments are explained with referring to drawings. In the respective drawings referenced herein, the same constitutions are designated by the same reference numerals and duplicate explanation concerning the same constitutions is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratio are different from one drawing to another.

First Embodiment (Overview of Sample Measurement Device)

With reference to FIG. 1, description is given of an overview of a sample measurement device according to this embodiment.

A sample measurement device 100 measures a sample injected into a container 300 including a housing unit 310 for housing a reagent that reacts with the sample. The sample measurement device 100 is, for example, a small-sized sample measurement device for PoC testing, and is configured to be able to execute measurement by a simple operation.

The measurement of the sample includes measurement of existence of a test material in accordance with a measurement item, the amount and concentration of the test material, the size, shape and the like thereof when the test material is a particle. The kind of the reagent housed in the container 300 may differ depending on the measurement item. There may be more than one variation of containers 300 for each measurement item. The container 300 may allow measurement of different measurement items.

The container 300 is a replaceable consumable. Specifically, the container 300 is discarded when used for measurement a number of times set in advance. The container 300 can be used once or several times. The container 300 may take the form of a cartridge, a well plate, and a tubular container, for example. A cartridge refers to a replaceable component having collection of functions necessary for detection of a test material contained in a sample. A well plate is a plate-like member having a well formed therein, the well being a recess capable of housing a liquid. A tubular container is a tube-shaped container having one end opened and the other end closed, such as a cuvette, a test tube, and a blood collection tube, for example.

The container 300 includes one or more housing units 310 for housing reagents used for measurement of the sample. Each housing unit 310 may house a reagent in advance, or may house no reagent. A reagent may be injected into the housing unit 310 housing no reagent from the outside of the container 300. Each housing unit 310 may have a volume enough to house a predetermined amount of liquid.

The sample measurement device 100 can perform, inside the container 300, mixing of a sample and a reagent, agitation, heating, cooling, movement of solid or liquid containing the sample, and other various kinds of operations.

The sample measurement device 100 includes a housing 10, a load section 20, a reader 30, a measurement unit 40, a mechanical unit 11, a detecting unit 12, and a control unit 50.

The housing 10 houses the load section 20, the reader 30, the measurement unit 40, the detecting unit 12, and the control unit 50. The housing 10 is a box-shaped member including an internal space having a predetermined volume, or is a combination of frames and exterior plates. The housing 10 of the sample measurement device 100 for PoC testing has a small box shape that allows installation on a table.

The housing 10 is provided with the mechanical unit 11. The mechanical unit 11 operates the container 300 loaded in the load section 20 to be shielded from light. The mechanical unit 11 includes a mechanical structure provided in the housing 10. The mechanical unit 11 is a movable unit to open and close a part of the housing 10, for example. The movable unit may include, for example, an openable and closable lid, a loader that moves the load section 20 into and out of the housing 10, and the like. The mechanical unit 11 may be moved directly by a user or may be moved by a motor or the like in response to a button operation or the like by the user. Here, the "user" is a user or an operator of the sample measurement device 100. The mechanical unit 11 does not include a display screen and a graphical user interface (GUI) such as virtual buttons displayed on a display screen.

In an example of FIG. 1, the mechanical unit 11 is a lid openably and closably covering the opening of the housing 10. The mechanical unit 11 has its one end rotatably supported, and is rotated to open and close the opening of the housing 10. An operation of opening the lid performed as an operation to the mechanical unit 11 results in a state where the container 300 can be loaded in the load section 20 inside the housing 10 through the opening of the housing 10. By performing an operation of closing the lid after loading the container 300, the container 300 is shielded from light inside the housing 10.

The load section 20 provides a load position for the user to load the container 300. In the housing 10, the load section 20 is provided at a predetermined position for measurement by the measurement unit 40, or is provided so as to be movable to the predetermined position. The container 300 with an information storage part 400 having information 410 recorded thereon can be loaded in the load section 20. The load section 20 holds the container 300. In the example of FIG. 1, the load section 20 is a loading stand that enables to load the container 300. The user can easily place to load the container 300 in the load section 20 by inserting the container 300 into the housing 10 in a state where the mechanical unit 11 is opened.

The load section 20 is formed into a shape corresponding to the shape of the container 300. More specifically, the load section 20 can load at least one container 300, such as a cartridge, a well plate, and a tubular container. In the example of FIG. 1, the container 300 is a plate-like cartridge, and the load section 20 has a recess for loading the cartridge. The load section 20 may be configured such that several kinds of containers 300 that differ in shape can be loaded therein.

The reader 30 is configured to read the information 410 recorded on the information storage part 400. The reader 30 is a contact or non-contact reader. The reader 30 is configured to read the information 410 by a reading method corresponding to the kind of the information storage part 400. For example, the reader 30 can read the information 410 from the information storage part 400 that is a bar code, a multidimensional code or an RF (Radio Frequency) tag.

When the information storage part 400 is a bar code or a multidimensional code, the reader 30 is an optical bar code scanner or camera. When the information storage part 400 is an RF tag, the reader 30 is a reader device using near field radio communication. Besides the above, when the information storage part 400 is a magnetic storage part such as a magnetic stripe card, for example, the reader 30 is a magnetic reader device. When the information storage part 400 is an electronic storage part such as a flash memory, for example, the reader 30 is an interface capable of reading information through connection with the electronic storage part.

The information storage part 400 has the information 410 prerecorded therein. The information 410 includes information on a reagent housed in the container 300, for example. The information 410 includes, for example, measurement items for the reagent, the lot number of the reagent, information that specifies the kind of the reagent, the expiry date of the reagent, and the like. Based on the information 410, the procedure of the measurement operations using the reagent, the duration of an individual operation, the content of the operation, temperature setting, and the like are determined, for example. Based on the information 410, a calibration curve for the lot number of the reagent, for example, is acquired, and sample measurement is performed using the acquired calibration curve. It is determined based on the information 410 whether or not the measurement can be started based on the expiry date, for example. If the expiry date has passed, for example, an error state can be set without starting the measurement.

Note that the terminal 500 includes, for example, portable information terminals such as a tablet terminal and a smartphone, and an information terminal such as a personal computer (PC). The terminal 500 receives an input operation by the user through a user interface 511 such as buttons displayed on a display screen 510. The input operation is detected by a touch panel when a portable information terminal such as a tablet terminal or a smartphone is used, or detected through a mouse, a keyboard, or any other input instrument when a terminal such as a PC is used.

The terminal 500 is connected in a wired or wireless manner to the sample measurement device 100. The wired connection includes connections through an inter-device connection interface such as a USB cable and through a communication interface such as a wired LAN, for example. The wireless connection includes communication connections through near field radio communication used for a wireless LAN, Bluetooth (registered trademark) or an RF tag, through any other infrared communication, and the like. Through such wired or wireless connection, information can be transmitted and received between the terminal 500 and the sample measurement device 100. The terminal 500 can browse a measurement result generated at the sample measurement device 100 through communication with the sample measurement device 100. The terminal 500 can transmit a predetermined operation command to the sample measurement device 100 through communication with the sample measurement device 100. Such connections may also be unidirectional connection through which only reception of information is performed at the sample measurement device 100 side.

The measurement unit 40 is configured to measure a sample housed in the container 300 loaded in the load section 20. Specifically, the measurement unit 40 performs, on the container 300 loaded in the load section 20, mixing of a sample and a reagent, agitation, heating, cooling, movement of solid or liquid containing the sample, and other various kinds of operations. For example, the measurement unit 40 moves a liquid by rotating the container 300 or separates a liquid component from a solid component by centrifugation. The measurement unit 40 agitates a specimen by rotating or moving the container 300 alternately in opposite directions or by intermittently rotating or moving the container 300. The measurement unit 40 moves magnetic particles in the container 300 by causing magnetic force to act from outside of the container 300, for example. The measurement unit 40 controls an internal reagent temperature to be a predetermined reaction temperature by heating or cooling the container 300, for example.

A reagent in the container 300 generates, through reaction with a test material in a sample, a change that enables direct or indirect measurement of the test material from the outside of the container 300. For example, the reagent emits light in accordance with the amount of the test material. The light emission is, for example, chemiluminescence or fluorescence. The reagent contains, for example, a labeling material that specifically connects with the test material. The labeling material generates, for example, a signal measurable from the outside of the container 300. The labeling material includes a chemiluminescence material, a fluorescent substance, a radioactive isotope, or the like. The reagent may be a material that is colored or clouded in accordance with the amount of the test material.

The measurement unit 40 directly or indirectly measures a test material in a sample by detecting a change generated through reaction of the test material in the sample with a reagent. To be more specific, the measurement unit 40 optically measures the sample housed in the container 300. When performing light emission detection, the measurement unit 40 includes a light detector such as a photomultiplier tube, a photoelectric tube, or a light diode. When performing radiation detection, the measurement unit 40 includes a radiation detector such as a scintillation counter, for example. When performing fluorescence, coloring, or cloud detection, the measurement unit 40 includes a light source and a light receiving element.

The control unit 50 includes a processor including, for example, a CPU and an FPGA. The control unit 50 controls operations of the reader 30 and the measurement unit 40. The control unit 50 also detects the execution of a predetermined operation of moving the mechanical unit 11 through the detecting unit 12. To be more specific, the detecting unit 12 detects that the container 300 is loaded to be shielded from light. In the example of FIG. 1, the detecting unit 12 detects that the mechanical unit 11 is closed. The detecting unit 12 outputs a signal to the control unit 50 when detecting that the mechanical unit 11 is closed. In response to the detection by the detecting unit 12, the control unit 50 controls the reader 30 and the measurement unit 40.

More specifically, when the detecting unit 12 detects that the mechanical unit 11 is closed, the control unit 50 causes the reader 30 to read the information 410 from the information storage part 400, and causes the measurement unit 40 to start sample measurement using the container 300. The measurement operation of the measurement unit 40 is controlled by the control unit 50.

When performing the measurement, the user sets the container 300 with the information storage part 400 in the load section 20. Then, the mechanical unit 11 is moved until a state where the container 300 is shielded from light is achieved after the container 300 is set in the load section 20. Finally, in a state where the mechanical unit 11 is closed, the container 300 loaded in the load section 20 is in a measurable position to shield light. The closing of the mechanical unit 11 is detected by the detecting unit 12. In response to the detection by the detecting unit 12, the control unit 50 causes the reader 30 to read the information 410. In response to the detection by the detecting unit 12, the control unit 50 causes the measurement unit 40 to start measurement. When starting the measurement, the control unit 50 determines a measurement operation based on the information 410 read from the information storage part 400 by the reader 30. Accordingly, the measurement is started by the user simply performing operations to move and close the mechanical unit 11.

According to the configuration example of FIG. 1, in response to detection that the container 300 is loaded to be shielded from light, the reader 30 reads the information 410 and the measurement unit 40 can measure the sample by using the container 300. Therefore, the user can allow the information 410 to be read just by moving the mechanical unit 11 so that the loaded container 300 is shielded from light. The use can also allow sample measurement to be started based on the read information 410. Such shielding of light for the container 300 is necessary for starting optical measurement by setting the container 300. Therefore, the user can start the measurement without performing a cumbersome operation of a user interface on a display screen just by loading the container 300 in a measurable state. Thus, the measurement can be started with a simpler operation.

(Sample Measuring Method)

Figure 2:
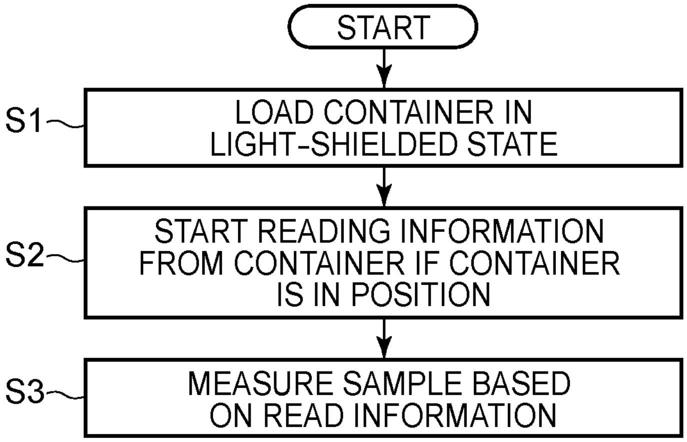
FIG. 2 is a flowchart illustrating a sample measuring method.

Next, with reference to FIG. 2, a sample measuring method is described. The sample measuring method is a method of optically measuring a sample housed in the container 300.

The sample measuring method includes the following steps. In Step S1, the container 300 is loaded to be shielded from light. In Step S2, in response to the loading the container 300, reading of the information 410 is started. In Step S3, a sample is measured based on the read information 410.

In Step S1, the container 300 is set in a position to shield light. For example, a space including the container 300 and the measurement unit 40 inside the housing 10 is set in a position to shield light from outside. The light-shielded state may be a state such that light is shielded and that does not affect optical measurement. The light-shielded state is a state where the number of incident photons detected by the measurement unit 40 when light emission does not occur inside the container 300 is preferably 1000/(mm$^2$·second) or less, more preferably 100/(mm$^2$·second) or less.

An operation of loading the container 300 to be shielded from light is an operation of closing the mechanical unit 11 after loading the container 300 in the load section 20 illustrated in FIG. 1, for example. The state where the container 300 is loaded to be shielded from light is detected by the detecting unit 12. The operation of loading the container 300 may be directly performed by a user, or an operation of closing a lid or the like may be automatically performed by a drive unit such as a motor in response to an input operation by the user to an operation unit such as a button.

Once the container 300 is loaded, reading of the information 410 from the container 300 is started in Step S2. In FIG. 1, for example, the information 410 is read by the reader 30. Step S2 is performed as a result of Step S1. In FIG. 1, for example, the measurement unit 40 optically measures the sample in a state where the container 300 is shielded from light inside the housing 10.

According to the configuration example of FIG. 2, with the above configuration, reading of the information 410 from the container 300 is started based on loading of the container 300, and the sample is measured based on the read information 410. Thus, the user can allow the information 410 to be read just by loading the container 300 in the light-shielded state without performing any information input, and can also start the sample measurement based on the read information 410. Moreover, the operation of loading the container 300 in the light-shielded state is necessary for starting the optical measurement by setting the container 300. Therefore, the user can start the measurement without performing a cumbersome operation of a user interface on a display screen just by loading the container 300 in a measurable state. Thus, the measurement can be started with a simpler operation.

(Specific Configuration Example of Sample Measurement Device)

FIGS. 3 to 11 illustrate a specific configuration example of the sample measurement device 100 using the container 300.

In an example illustrated in FIGS. 3 to 11, the sample measurement device 100 is an immunoassay device that detects a test material in a sample by utilizing antigen-antibody reaction and measures the test material based on a result of the detection. The sample measurement device 100 performs measurement by using the container 300 as a disk-shaped cartridge.

The housing 10 of the sample measurement device 100 includes a main body unit 101 and a lid 102. The lid 102 is rotatably attached to the main body unit 101 at the end thereof so as to cover an upper surface portion of the main body unit 101. The lid 102 is provided so as to cover approximately the entire surface of the upper surface portion of the main body unit 101. The load section 20 is positioned in the upper surface portion of the main body unit 101. Thus, the lid 102 is provided so as to rotate up and down about the end attached to the main body unit 101, and to be openable and closable between a state illustrated in FIG. 3 where the load section 20 is opened and a state illustrated in FIG. 4 where the load section 20 is covered. With this configuration, the upper surface portion of the main body unit 101 is opened when the lid 102 is opened. Thus, an installation operation of the container 300 by the user can be facilitated.

Figure 3:
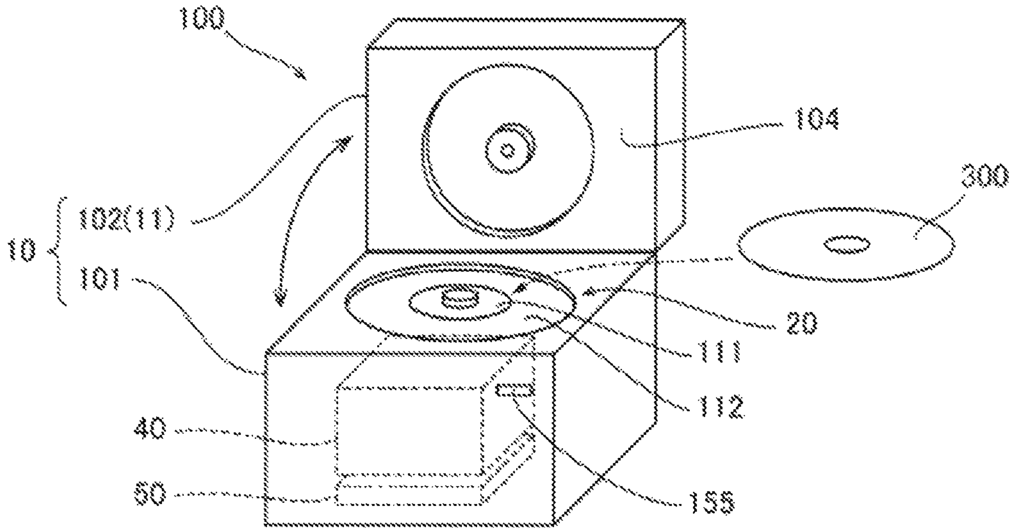
FIG. 3 is a perspective view illustrating a state where a lid of the sample measurement device is opened.
Figure 4:
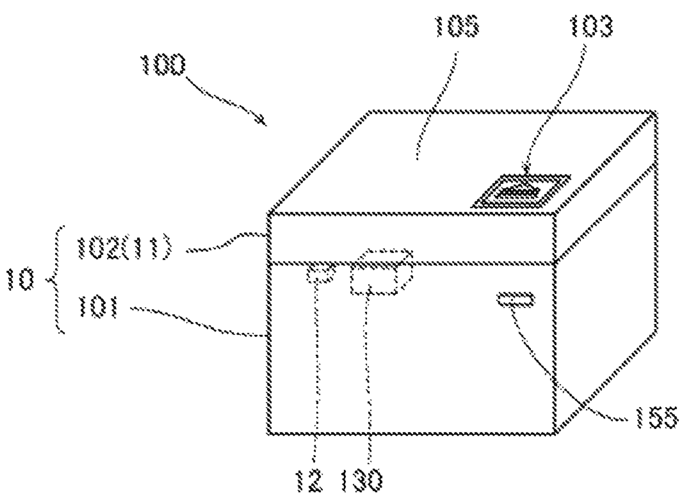
FIG. 4 is a perspective view illustrating a state where the lid of the sample measurement device is closed.

In the example illustrated in FIGS. 3 and 4, the mechanical unit 11 includes the openable and closable lid 102 covering the load section 20. The sample measurement device 100 detects closing of the lid 102. This closing of the lid 102 sets the container 300 in a position to shield light inside the housing 10.

In the example illustrated in FIGS. 3 and 4, the sample measurement device 100 reads the information 410 from the container 300 when detecting the closing of the lid 102. Thus, in the sample measuring method according to the example of FIGS. 3 and 4, the lid 102 of the sample measurement device 100 is opened to load the container 300, the lid 102 is closed to shield light from the container 300, and reading of the information 410 from the container 300 is started in response to the closing the lid 102. Accordingly, the user can start to read the information 410 and measurement with a very simple operation of closing the lid 102 after loading the container 300 by opening the lid 102.

The sample measurement device 100 also includes an operation unit 103 for mechanically moving the mechanical unit 11, such that the load section 20 is ready for loading of the container 300. The sample measurement device 100 enables the container 300 to be loaded in response to an operation to the operation unit 103 for mechanically moving the mechanical unit 11. In the example illustrated in FIGS. 3 and 4, the operation unit 103 includes a button that can be pressed. Thus, unlike a case where the mechanical unit 11 is moved by operating a user interface on a display screen, for example, an operation of moving the mechanical unit 11 can be performed directly to the operation unit 103. Therefore, the user can easily load the container 300 without performing a cumbersome operation of the user interface on the display screen.

The user operates the operation unit 103 to load the container 300 in the load section 20. The user performs a first operation. The operation unit 103 is operated to open the lid 102 provided in the housing 10. More specifically, the sample measurement device 100 opens the lid 102 such that the load section 20 is ready for loading of the container 300, in response to the operation to the operation unit 103 for moving the mechanical unit 11. Thus, unlike a case where the lid is opened by operating a user interface on a display screen, for example, an operation of opening the lid 102 can be performed directly to the operation unit 103. Therefore, the user can easily load the container 300 without performing a cumbersome operation of the user interface on the display screen.

In the example illustrated in FIGS. 3 and 4, the container 300 is loaded in the load section 20 opened by an operation of pressing the operation unit 103. The user closes the opened lid 102 to set a state where measurement can be performed by using the container 300 loaded in the load section 20. Once the detecting unit 12 detects that the lid 102 is closed, the control unit 50 causes the reader 30 to start to read the information 410, and causes the measurement unit 40 to start measurement. More specifically, once detecting that the lid 102 is closed, the sample measurement device 100 starts to read the information 410 from the information storage part 400 in the container 300, and measures a sample based on the information 410.

In the configuration example of FIG. 3, the mechanical unit 11 moves to enable the load section 20 to be loaded or to be measured using the container 300 loaded in the load section 20, based on an operation independent of an operation of a user interface for information input. More specifically, the lid 102 moves to make the load section 20 ready for loading of the container 300, based on an operation of the operation unit 103. Thus, the load section 20 can be made ready for loading of the container 300 and the user can easily load the container 300 without performing a cumbersome operation of a user interface on a display screen. Then, just by closing the mechanical unit 11, the user can allow the information 410 on the information storage part 400 to be read, and start sample measurement based on the read information 410.

The sample measurement device 100 illustrated in FIGS. 3 and 4 is a "display-less" device without including display screen. Specifically, when used alone, the sample measurement device 100 does not perform any input operations through a user interface. Therefore, a more user-friendly sample measurement device can be realized for users inexperienced in user interface operation.

<Container>

Figure 5:
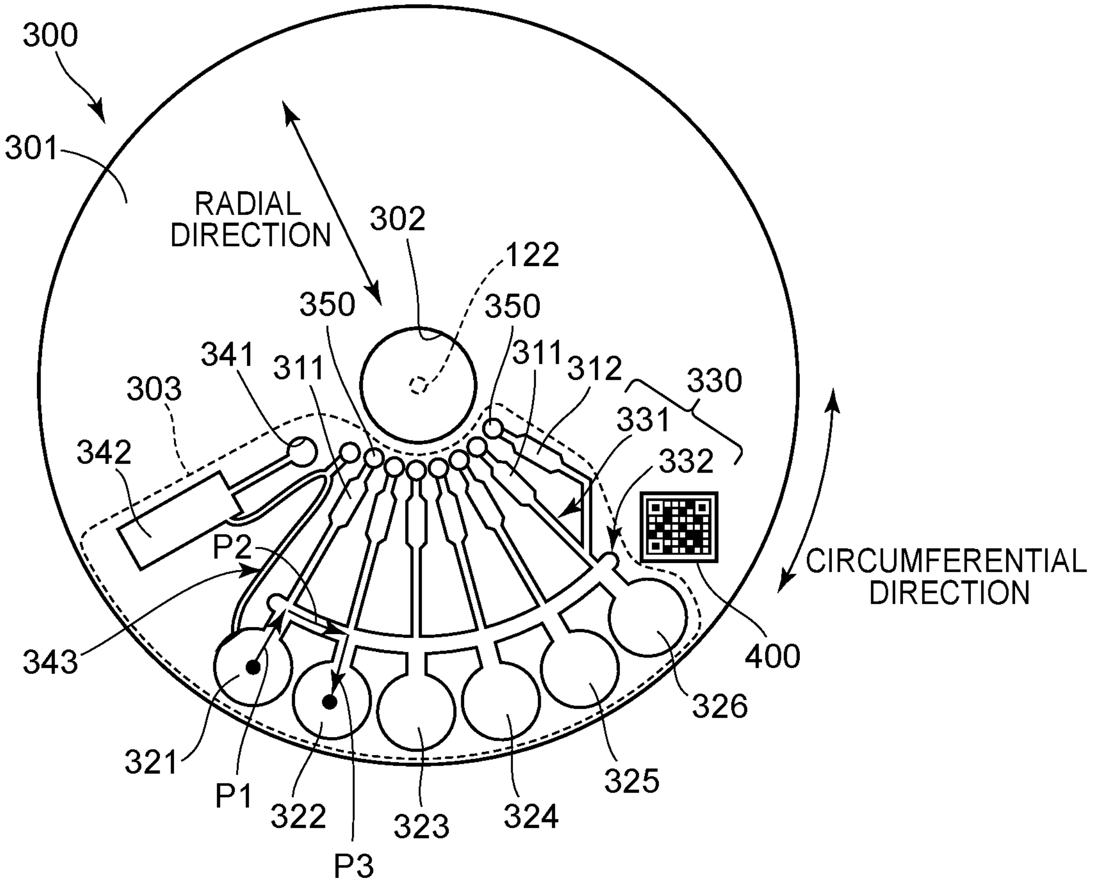
FIG. 5 is a plan view illustrating a configuration example of a disk-shaped container.

As illustrated in FIG. 5, the container 300 is a disk-shaped cartridge made of a substrate 301 having a plate disk shape. Each component in the container 300 is formed by adhering, to a recess part formed in the substrate 301, unillustrated films covering the entire surface including the recess part. The substrate 301 and the films attached to the substrate 301 are made of a translucent member. The substrate 301 has a thickness that facilitates temperature adjustment of the container 300 by a heater 44 to be described later. For example, the thickness of the substrate 301 is several millimeters, and specifically about 1.2 mm.

The substrate 301 is provided with a hole 302, and a sample processing region 303 including six housing units 311, one housing unit 312, six chambers 321 to 326, a channel 330, an opening 341, a separator 342, and a channel 343. The hole 302 penetrates through the substrate 301 at the center of the substrate 301. The container 300 is installed on the sample measurement device 100 such that the center of the hole 302 overlaps and coincides with the center of a rotation shaft 122 to be described later. Hereinafter, the radial and circumferential directions of a circle centered at the rotation shaft 122 are referred to as the "radial direction" and "circumferential direction", respectively. Each of the chambers 321 to 326 is a space capable of housing a liquid. The chambers 321 to 326 are arranged in the circumferential direction near the outer periphery of the substrate 301.

The channel 330 includes six radial regions 331 extending in the radial direction and an arc-shaped circumferential region 332 extending in the circumferential direction. The circumferential region 332 is connected to the six radial regions 331. The six radial regions 331 are connected to the chambers 321 to 326, respectively. The six housing units 311 are connected to the channel 330 through a radial channel. The six housing units 311 are arranged side by side in the radial direction with the chambers 321 to 326 corresponding thereto, respectively. The housing unit 312 is connected to a channel connecting between the chamber 326 and the housing unit 311, through a channel extending mainly in the radial direction. The seven housing units 311 and 312 in total are arranged on the inner periphery side of the container 300, and the six chambers 321 to 326 in total are arranged on the outer periphery side of the container 300.

Each of the housing units 311 and 312 houses a reagent and includes a sealing body 350 on its upper surface on the inner side of the radial direction. The sealing body 350 is configured to be openable when pressed from above with a plug opening unit 43 to be described later. The reagent in the housing unit 311 does not flow into the channel 330 before the sealing body 350 is opened, and starts flowing into the channel 330 once the sealing body 350 is opened. The reagent is moved to the corresponding chambers 321 to 326 by centrifugal force when the container 300 is rotated.

A sample is injected through the opening 341. The sample is a blood sample of whole blood collected from a subject. The blood sample is injected into the separator 342 through the opening 341. The separator 342 separates the injected blood sample into blood cells and plasma. The plasma separated by the separator 342 moves to the channel 343. The plasma in the channel 343 is moved to the chamber 321 by centrifugal force when the container 300 is rotated. Thus, a predetermined amount of plasma is transferred to the chamber 321.

In the chamber 321, dried magnetic particles are fixed. The sample measurement device 100 is configured to detect a test material based on a labeling material by sequentially transferring the magnetic particles to the chambers and thus allowing the magnetic particles to carry the test material and the labeling material. More specifically, the magnetic particles carrying the test material is moved in the radial direction by magnetic force. Thus, the magnetic particles are moved in the radial direction between the inside of the chamber 321 and the arc-shaped circumferential region 332 of the channel 330. When the container 300 is rotated, the magnetic particles move in the circumferential direction within the arc-shaped circumferential region 332. Such radial movement by the action of magnetic force and circumferential movement by the rotation are combined to move the magnetic particles carrying the test material to the chambers 321 to 326. Then, processing using a reagent is performed in each of the chambers 321 to 326. Finally, the magnetic particles carrying the test material and the labeling material are moved to the chamber 326, and measurement is performed by the measurement unit 40 detecting the labeling material.

Note that the sample processing region 303 in the example of FIG. 5 is formed only in a one-third region of the substrate 301. However, the disclosure is not limited thereto, but three sample processing regions 303 may be provided in the substrate 301 by providing two additional sample processing regions 303 in the remaining two-thirds region of the substrate 301. Note that one sample processing region 303 may be formed over the area larger than the one-third region of the substrate 301.

When more than one sample processing region 303 is provided, the respective sample processing regions 303 may be those for the same measurement item or may be those for different measurement items. When more than one sample processing region 303 is provided for the same measurement item, measurement of the same measurement item can be performed more than once in one container 300. When the sample processing regions 303 are provided for different measurement items, measurement of several measurement items can be performed in one container 300 for the same sample.

<Information Storage Part>

In the example of FIG. 5, the information storage part 400 is provided to the container 300. To be more specific, the information storage part 400 is a two-dimensional code. The information storage part 400 is provided to the container 300 by attaching a label with the two-dimensional code printed thereon or by directly printing the two-dimensional code on the surface of the container 300. The information storage part 400 may be a bar code.

Figure 6:
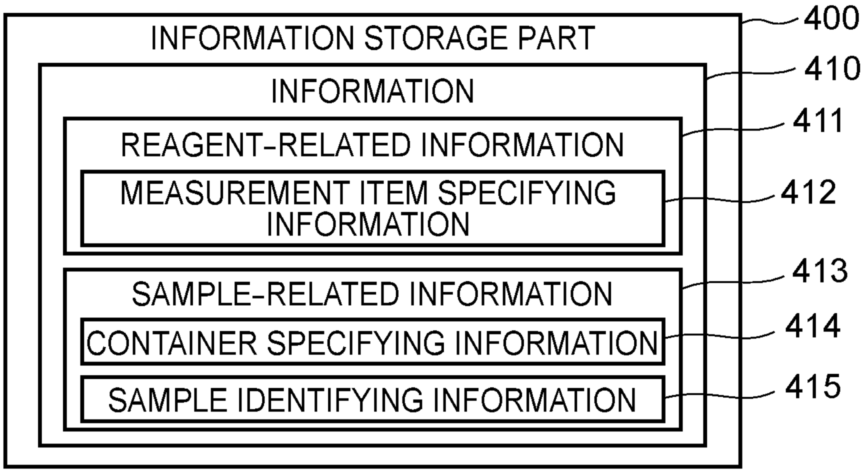
FIG. 6 is a diagram illustrating information recorded in an information storage part.

As illustrated in FIG. 6, the information 410 in the information storage part 400 includes reagent-related information 411. The reagent-related information 411 is, for example, the lot number of the reagent. The reagent-related information 411 may include, for example, information that specifies the kind of the reagent, the expiry date of the reagent, and the like. Thus, the reagent-related information 411 can be acquired without the user directly performing information input. Then, a measurement operation corresponding to the reagent used for measurement can be executed based on the reagent-related information 411.

In an example illustrated in FIG. 6, the reagent-related information 411 includes information 412 that specifies a measurement item for the sample. For example, the measurement item specifying information 412 is a code indicating the measurement item, or the name itself of the measurement item. The control unit 50 controls the measurement unit 40 based on the measurement item specifying information 412 for the sample. Thus, a measurement operation using the reagent in the container 300 is determined based on the measurement item for the sample. As a result, particularly when the sample measurement device 100 can measure several kinds of measurement items by using several kinds of containers 300, measurement can be performed through measurement operations appropriate for the measurement items.

To be more specific, the procedure of the measurement operations using the reagent, the duration of an individual operation, the content of the operation, and temperature setting are determined in accordance with a measurement item. For example, a measurement operation for the measurement item is preset in the sample measurement device 100. Based on the measurement item specifying information 412 for the sample, measurement processing for the measurement item is executed. In other words, the measurement item specifying information 412 is information that specifies the kind of the container 300. Thus, a measurement operation using the reagent in the container 300 can be determined based on the measurement item for the sample. Therefore, the user can easily find out the measurement item even when measurement can be performed for several kinds of measurement items by using several kinds of containers 300.

For example, the information 410 in the information storage part 400 includes sample-related information 413. In this case, the control unit 50 associates the measurement result obtained by the measurement unit 40 with the information 410. Thus, the sample-related information 413 can be acquired without the user directly performing information input. Then, the measurement result can be managed in association with the sample, based on the sample-related information 413.

To be more specific, the information 410 in the information storage part 400 includes information 414 that specifies the container 300. The information 414 that specifies the container 300 is a container ID that uniquely identifies the container 300. The container ID may be any information unique to the individual container 300, such as a manufacturing number or a dedicated identification number other than the manufacturing number. Accordingly, the container 300 used in the measurement can be identified, and thus the measurement result can be easily managed. For example, it is possible to avoid inappropriate measurement by specifying the use of a container other than a legitimate product and the reuse of a used container, thereby improving the reliability of the device.

For example, the sample-related information 413 includes sample identifying information 415. Accordingly, the sample injected into the container 300 can be identified, and thus the measurement result can be easily managed.

The sample identifying information 415 may be, for example, a container ID. Here, the measurement result can be transmitted and saved in a server 600 to be described later, in association with the container ID of the container 300 used. Meanwhile, the user manages information on a sample or information on a subject from whom the sample is collected, by using a common container ID. As a result, the information on the sample or the information on the subject from whom the sample is collected can be specified using the container ID. In this case, the container ID may be the sample identifying information. By using the sample identifying information 415 as information associated with the measurement result and the information on the sample or the subject, the sample associated with the measurement result can be identified based on the sample identifying information 415.

Note that, when the sample identifying information 415 is used as the information associated with the measurement result and the information on the sample or the subject, the sample identifying information 415 may be any information other than the container ID or encrypted information. The sample identifying information 415 may be any kind of information as long as the information is associated with the measurement result and the information on the sample or the subject. Information A which is information associated with the measurement result may be different from information B which is information associated with the sample or the subject. For example, the information A may be obtained by encrypting the information B with a predetermined technique. In this case, a method of decrypting the information A may be provided to the user. The information B can be obtained by the user decrypting the information A associated with the measurement result. Thus, the information on the sample or the subject associated with the information B can be identified. As described above, the information A associated with the measurement result and the information B associated with the information on the sample or the subject do not have to be the same information as long as the both information have an identifiable correspondence relationship with each other.

Besides the above, the sample identifying information 415 may be a sample ID set for the sample injected into the container 300, a patient ID of the subject from whom the sample is collected, or the like. The sample ID and the patient ID may be any kind of information as long as the both are unique information that identifies the sample and the patient. The sample ID and the patient ID enable direct identification of the sample.

All information recorded in the information storage part 400 may be encrypted information. In this case, the information recorded in the information storage part 400 is insignificant encrypted information per se. The information is read by the reader 30 and converted into the lot number of the reagent, the measurement item, the container ID of the container 300, and the like through decoding by a predetermined decoding method at the control unit 50.

<Internal Structure of Sample Measurement Device>

Subsequently, with reference to FIG. 7, an internal structure of the sample measurement device 100 is described.

As illustrated in FIG. 3, the load section 20 serves as the upper surface portion of the main body unit 101 covered by the lid 102 in an openable and closable manner. The load section 20 includes: a support member 111 that supports the container 300 from below; and an upper surface member 112 provided at a position immediately below the support member 111. The support member 111 is, for example, a turntable. The support member 111 is provided at slightly in distance above from the upper surface member 112, and supports the container 300 in a noncontact manner with the upper surface member 112. The upper surface member 112 is included in the upper surface portion of the main body unit 101.

<Measurement Unit>

Figure 7:
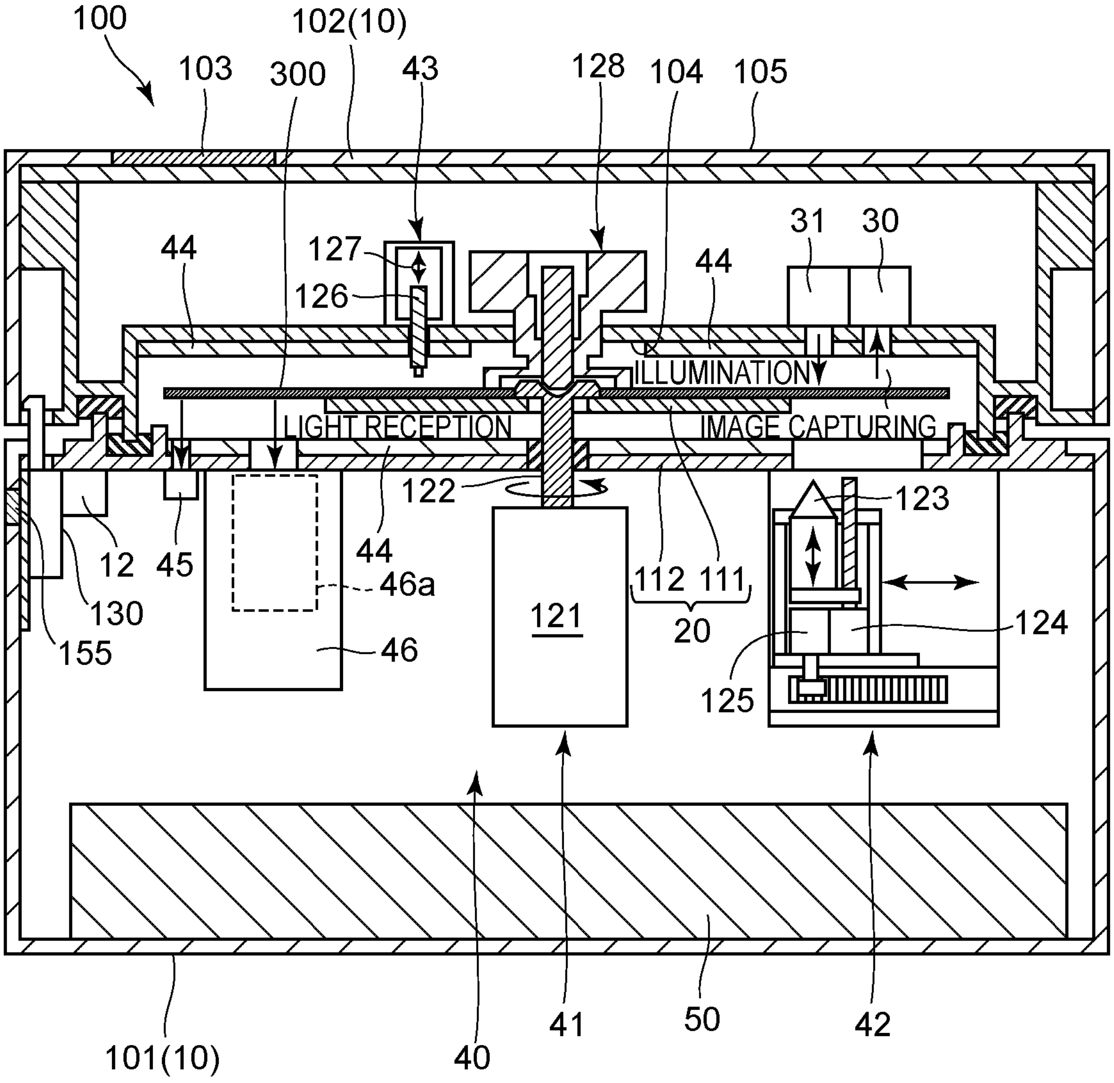
FIG. 7 is a longitudinal sectional view illustrating a configuration example of the sample measurement device.

In an example of FIG. 7, the measurement unit 40 includes a rotation drive unit 41, a magnet drive unit 42, a plug opening unit 43, a heater 44, a temperature sensor 45, and a light detection unit 46.

The rotation drive unit 41 is a mechanical unit that rotates the container 300. The rotation drive unit 41 performs centrifugation of a blood sample, transfer of a reagent to each of the chambers 321 to 326, agitation of the reagent and the sample, transfer of magnetic particles in the circumferential direction between the chambers 321 to 326, and the like inside the container 300 through rotation.

The rotation drive unit 41 includes a motor 121 and a rotation shaft 122. The rotation shaft 122 extends in a vertical direction. The rotation shaft 122 extends from the inside of the main body unit 101 through the opening of the upper surface member 112 to the upper surface side of the load section 20. The rotation shaft 122 has its upper end fixed to the support member 111 and its lower end fixed to a drive shaft of the motor 121. More specifically, the rotation drive unit 41 rotatably supports the support member 111 in the load section 20. The rotation drive unit 41 drives the motor 121 to rotate the container 300 placed on the support member 111 about the rotation shaft 122.

The magnet drive unit 42 includes a magnet 123 and has a function to move magnetic particles inside the container 300 in the radial direction. The magnet drive unit 42 is provided below the load section 20 and is configured to move the magnet 123 in the radial direction at least within a range between the chambers 321 to 326 and the circumferential region 332 of the channel 330 as seen in FIG. 5. The magnet 123 is provided to generate magnetic force upward from below the load section 20. The magnet drive unit 42 includes a first drive section 124 and a second drive section 125.

The first drive section 124 is configured to move the magnet 123 up and down. The first drive section 124 can move the magnet 123 between a position close to the container 300 to capture the magnetic particles by the magnetic force and a position away from the container 300 not to capture the magnetic particles by the magnetic force. During an agitation operation or the like in the chambers 321 to 326, the magnet 123 is separated from the container 300. The second drive section 125 is configured to move the magnet 123 in the radial direction. The second drive section 125 moves the magnet 123 in the radial direction within a range between the radial positions of the chambers 321 to 326 and the radial position of the circumferential region 332. The first and second drive sections 124 and 125 each include a motor and a direct acting mechanical unit. The direct acting mechanical unit is formed by combining, for example, a threaded shaft with a nut, combining a rack gear with a pinion gear, or the like to linearly move a movable part.

The plug opening unit 43 is provided in the lid 102 above the load section 20. The plug opening unit 43 includes: a pin member 126 movable relative to the container 300 from above the container 300 loaded in the load section 20; and a drive section 127 that drives the pin member 126 back and forth. The pin member 126 is driven to protrude by the drive section 127 and contact with the container 300, thereby opening the sealing body 350 illustrated in FIG. 5 by pressing. Then, the pin member 126 is pulled back by the drive section 127 and moved to a retracted position where the pin member 126 is away from the container 300 and not in contact therewith.

The heaters 44 are provided on the upper surface member 112 in the load section 20 directly below the container 300 and on an inner surface part 104 of the lid 102 directly above the container 300, respectively. The temperature sensor 45 is provided below the upper surface member 112. The temperature sensor 45 faces the container 300 through an opening formed in the upper surface member 112, and detects the temperature of the container 300 by infrared. The heaters 44 heat a specimen housed in the chambers 321 to 326 to a predetermined reaction temperature to promote reaction between a sample and a reagent.

The light detection unit 46 is provided below the upper surface member 112 of the load section 20. The light detection unit 46 includes a light receiving unit at a position facing the container 300 loaded in the load section 20 through an opening formed in the upper surface member 112. With this configuration, the light detection unit 46 detects, through the light receiving unit, light emitted from the chamber 326. The light detection unit 46 includes a light detector 46*a* such as a photomultiplier tube, a photoelectric tube, or a light diode, for example. The light detector 46*a* outputs a pulsed waveform in accordance with received photons. The light detection unit 46 includes an internal circuit that counts photons at a constant interval based on an output signal from the light detector 46*a* and outputs a count value.

The lid 102 has a housing space between the inner surface part 104 and an upper surface part 105. In the housing space, a clamper 128, the reader 30, and an illumination unit 31 are provided besides the plug opening unit 43. The inner surface part 104 has holes provided at positions corresponding to the reader 30, the illumination unit 31, and the plug opening unit 43. Through these holes, the reader 30, the illumination unit 31, and the plug opening unit 43 directly face the upper surface of the container 300.

The clamper 128 is provided in the center of the support member 111 so as to face the support member 111 from above on the inner surface side of the lid 102. The clamper 128 rotatably supports a central part of the upper surface of the container 300 installed on the support member 111 when the lid 102 is closed. The container 300 is supported between the support member 111 and the clamper 128. The clamper 128 penetrates through the inner surface part 104, can vertically stroke in a predetermined range, and is biased toward the support member 111. The clamper 128 is provided with an unillustrated stroke detection sensor. The control unit 50 can detect, based on a difference in the amount of stroke of the clamper 128, a state where the container 300 is not installed, a state where the container 300 is appropriately installed, and a state where the container 300 is inappropriately installed due to a positioning error or the like even though the container 300 is installed.

In the example of FIG. 7, the reader 30 is an image capturing unit that captures an image of the information storage part 400 as seen in FIG. 5 that is a two-dimensional code. The reader 30 directly faces the upper surface of the container 300 through the hole provided in the inner surface part 104. Likewise, the illumination unit 31 directly faces the upper surface of the container 300 through the hole provided in the inner surface part 104. The reader 30 includes, for example, a CCD image sensor, a CMOS image sensor, and the like. The illumination unit 31 includes, for example, a light-emitting diode, and generates illumination light at image capturing. An installation position of the information storage part 400 in the container 300 is previously determined, and the reader 30 captures an image of the information storage part 400 in a state where the container 300 is rotated in the circumferential direction and the information storage part 400 is installed in an image capturing field. The information 410 is read from the captured image of the two-dimensional code.

The sample measurement device 100 includes the operation unit 103 described above, a lock mechanism 130 for the lid 102, and the detecting unit 12 that detects opening and closing of the lid 102.

The operation unit 103 is provided in the upper surface part 105 of the lid 102. The operation unit 103 includes a button that can be pressed. The lock mechanism 130 locks the lid 102 by engaging with the lid 102 being closed. The lock mechanism 130 includes a drive source, and releases the locked state in response to a control signal from the control unit 50. The detecting unit 12 detects if the lid 102 is in a closed state or an opened state. The detecting unit 12 is, for example, a contact sensor, an optical sensor, or the like. The detecting unit 12 may be a connection terminal configured to achieve conduction when the lid 102 is closed, or the lock mechanism 130 may also serve as the detecting unit 12. The control unit 50 is connected to the operation unit 103, and releases the locking by the lock mechanism 130 when pressing of the operation unit 103 is detected. The lid 102 is biased in an opening direction by an unillustrated biasing member, and is set in the opened state where the load section 20 is opened by biasing force when the locking is released. Note that the user directly operates the lid 102 to close the lid 102. Such closing of the lid 102 is detected by the detecting unit 12.

Figure 8:
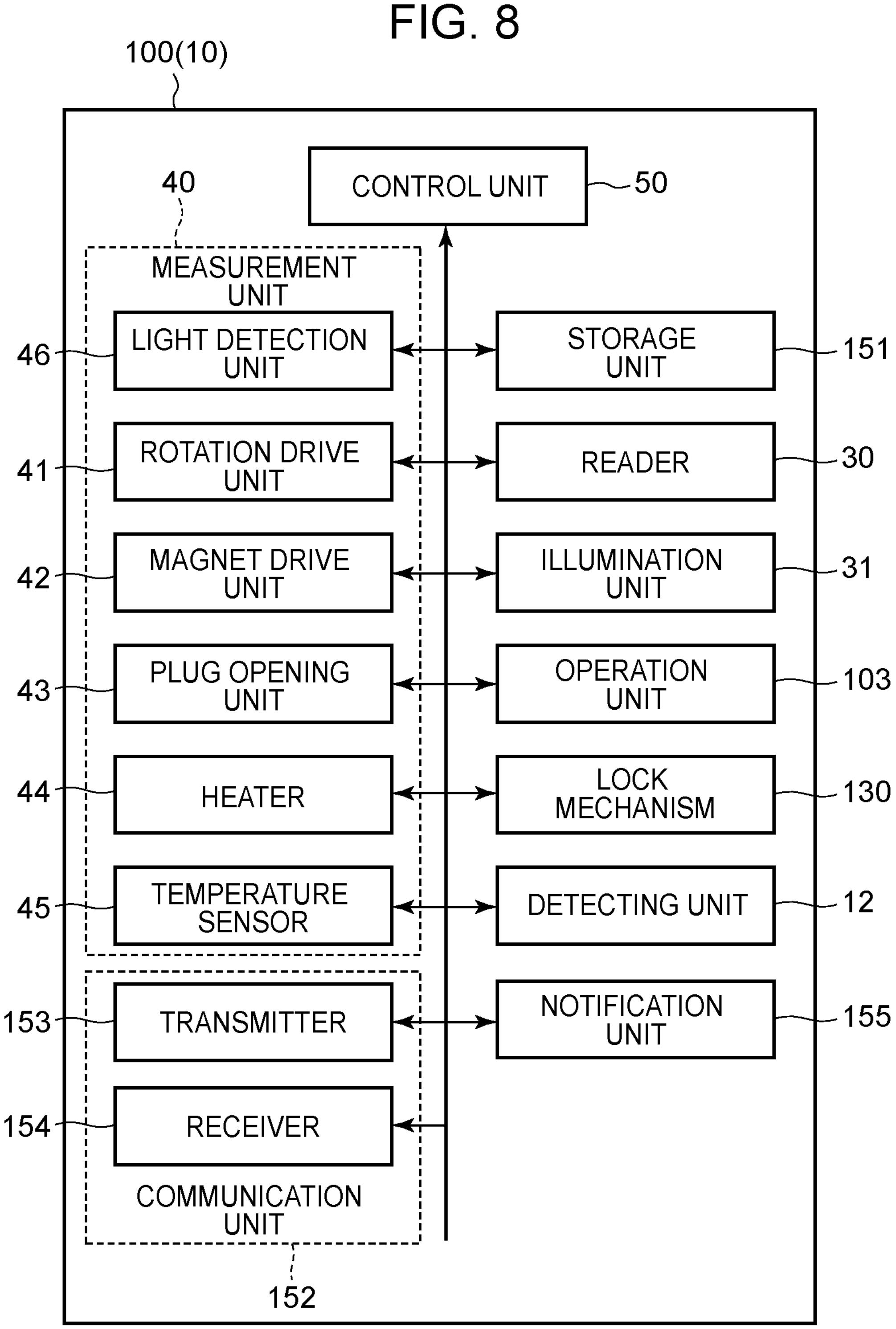
FIG. 8 is a block diagram illustrating a control configuration example of the sample measurement device.

FIG. 8 illustrates a control configuration of the sample measurement device 100.

The control unit 50 includes, for example, a processor and a memory. The processor includes, for example, a CPU, an MPU, and the like. The memory includes, for example, a ROM, a RAM, and the like. The control unit 50 receives a signal from each component of the sample measurement device 100, and controls each component of the sample measurement device 100.

The sample measurement device 100 includes a storage unit 151 that stores a measurement result obtained by the measurement unit 40. The storage unit 151 includes, for example, a flash memory, a hard disk, and the like. The storage unit 151 can store the measurement result of measurement performed, without providing a display screen or the like in the sample measurement device 100. In browsing the measurement result, the measurement result can be read from the storage unit 151 through connection with a terminal or a server. Thus, the sample measurement device 100 made easier for the user to handle can be provided. The storage unit 151 stores the information 410 read from the information storage part 400, besides the measurement result.

Figure 9:
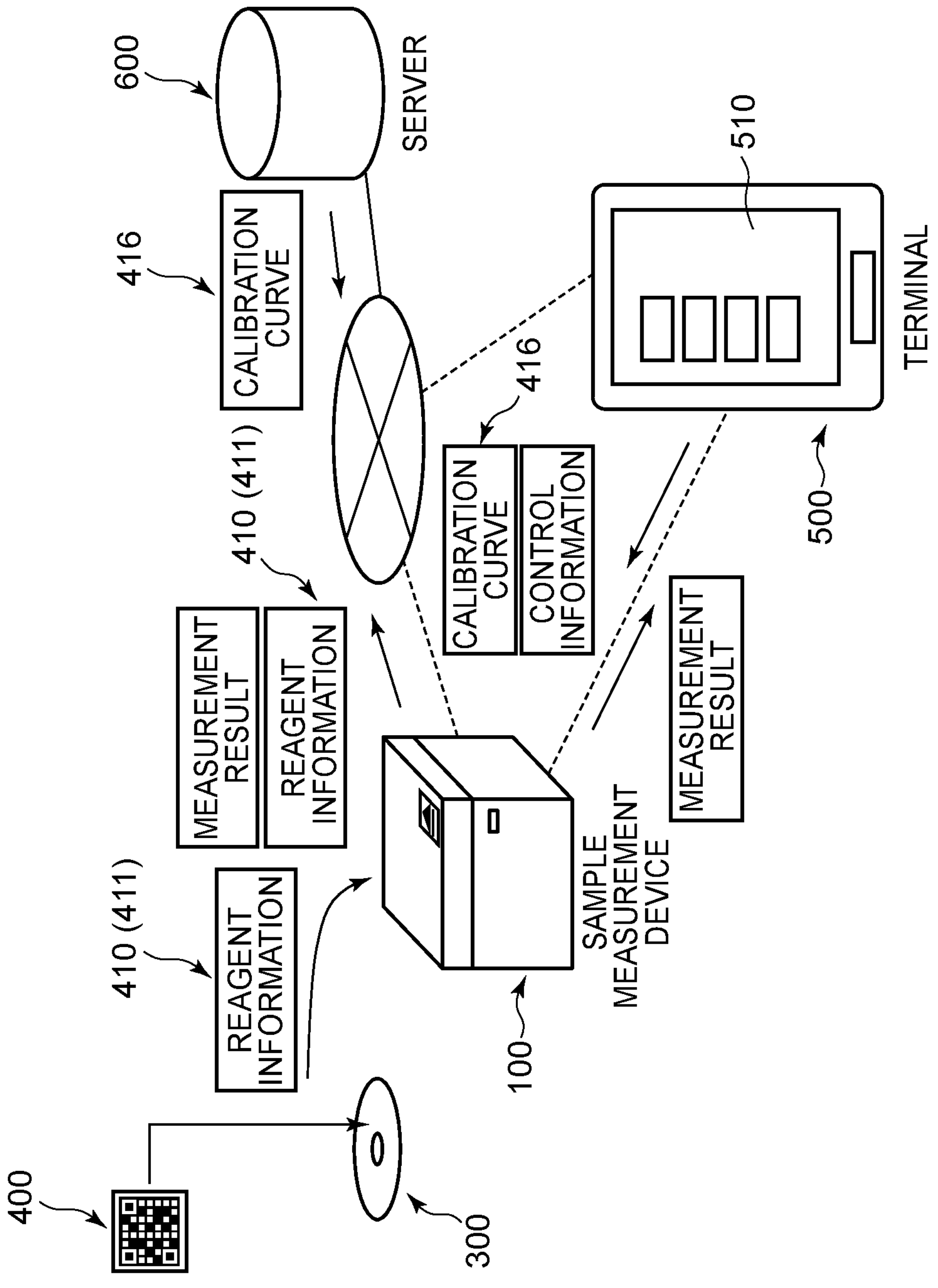
FIG. 9 is a diagram illustrating a network related to the sample measurement device.

The sample measurement device 100 includes a communication unit 152. The communication unit 152 includes a transmitter 153 and a receiver 154. The communication unit 152 includes, for example, a communication module, an external connection interface or the like. As illustrated in FIG. 9, the communication unit 152 can perform, in a wired or wireless manner, communication with a terminal 500 and communication with a server 600 through a network. The communication unit 152 may be able to perform communication in several kinds of communication schemes. Connection with the network is achieved by, for example, a wired LAN, a wireless LAN or the like. Connection with the terminal 500 may be achieved by Bluetooth (registered trademark) or any other near field communication (NFC) besides the wired LAN and wireless LAN. Connection with the terminal 500 may also be achieved by an external connection interface such as a USB.

The transmitter 153 can transmit, in a wireless or wired manner, the measurement result of a sample obtained by the measurement unit 40 to the terminal 500 or the server 600. Thus, the measurement result of measurement performed can be transmitted to the terminal 500 or the server 600 without providing a display screen or the like in the sample measurement device 100. Therefore, the sample measurement device 100 that can be more easily handled by the user can be provided. The measurement result may be transmitted to both of the terminal 500 and the server 600. The terminal

500 can display the transmitted measurement result on a display screen 510. The user can browse the measurement result obtained by the sample measurement device 100 on the display screen 510.

The receiver 154 is configured to be able to receive at least a signal from the terminal 500 in a wireless or wired manner.

Here, the sample measurement device 100 performs sample measurement by using a calibration curve associating a count value of the measurement result obtained using a reagent with the amount of the test material. The calibration curve is previously created for each manufacturing lot of the reagent. In the example of FIG. 9, the communication unit 152 transmits the information 410 read by the reader 30 to the terminal 500 or the server 600, and acquires a calibration curve 416 for the measurement using the reagent housed in the container 300.

To be more specific, the calibration curve 416 specified by the reagent-related information 411 such as the lot number is previously created by a manufacturer of the reagent and registered in the server 600. The terminal 500 can acquire the calibration curve 416 from the server 600 through a network. The communication unit 152 transmits the reagent-related information 411 as the information 410 to the terminal 500 or the server 600. The communication unit 152 acquires the calibration curve 416 specified based on the reagent-related information 411 through the terminal or directly from the server 600. The control unit 50 performs measurement of the measurement result based on a count value of the measurement result obtained by the measurement unit 40 and the calibration curve 416 of the reagent housed in the container 300.

Thus, information on the calibration curve 416 is specified based on the information 410 read by the reader 30, and the information thus specified can be acquired through communication from the terminal 500 or the server 600. In this case, the calibration curve 416 does not have to be registered in the information storage part 400. Accordingly, a recording capacity of the information storage part 400 can be easily secured. Moreover, the calibration curve 416 may slightly vary depending on an elapsed period after the manufacture of the reagent, or the like. With the configuration utilizing the terminal 500 or the server 600, the information on the calibration curve 416 can be updated through a network, and thus more accurate measurement result can be achieved.

In FIG. 8, the sample measurement device 100 includes a notification unit 155 in FIG. 3 capable of notifying the state of the device by a method different from screen display. This eliminates the need to provide a display screen for notifying the state. Therefore, the device configuration can be simplified.

The notification unit 155 notifies the state of the device through at least one of light coloring, light emission, light blinking, sound, and information transmission to the terminal 500. Specifically, the notification unit 155 may be an indicator that performs notification by light emission, or a speaker or buzzer that performs notification with a sound. The notification unit 155 may be a communication module or external connection interface having the same configuration as that of the transmitter 153. When the notification unit 155 is provided, notification can be performed in a manner easily recognizable by the user without using the display screen.

FIG. 3 illustrates an example where the notification unit 155 is the indicator that performs notification by light emission. The notification unit 155 is provided on the surface of the housing 10, for example. In FIG. 3, one notification unit 155 is provided in an upper front portion of the main body unit 101. The notification unit 155 includes a light-emitting diode capable of emitting multiple colors of light. More than one notification unit 155 may be provided.

Figure 10:
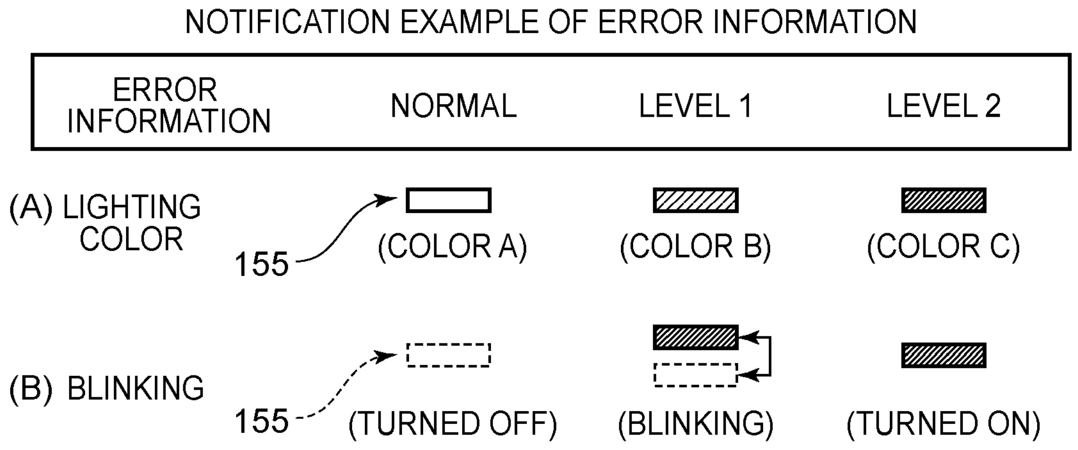
FIG. 10 is a schematic view illustrating an example A of notifying error information with lighting colors and an example B of notifying the error information with lighting and blinking.

As illustrated in FIG. 10, the notification unit 155 notifies at least an error state. For example, the notification unit 155 performs notification in a level-specific manner that differentiates a normal state and the error state. Thus, the error state of the device can be notified to the user without using the display screen.

For example, the notification unit 155 notifies, as the error state, at least any of error severity, error significance, and classification of an error-handling operation in the state-specific manner. In an example of FIG. 10, the notification unit 155 performs notification while differentiating the normal state, a level 1 error state, and a level 2 error state.

FIG. 10A illustrates an example where the state is notified by the color of light. The notification unit 155 displays the normal state in color A, the level 1 error state in color B, and the level 2 error state in color C. Colors A, B, and C are different from each other, such as green, yellow, and red, for example.

FIG. 10B illustrates an example where the state is notified by light emission and light blinking. The notification unit 155 displays the normal state by a turned-off state, the level 1 error state by a blinking state, and the level 2 error state by a continuously turned-on state.

Next, an example of a content of an error to be notified is described. As for the error severity, for example, Level 1 is an error state expected to be restored by restart or the like, while Level 2 is an error state required to be transmitted to a service center of the sample measurement device 100 or to be handled by a professional engineer. As for the error significance, for example, Level 1 is an error state suggesting remeasurement since the measurement result may not be stable, such as when the operating temperature is outside the suggested range, while Level 2 is an error state in which the measurement result cannot be outputted, or the like. As for the classification of the error-handling operation, for example, Level 1 is an error state that can be handled by the user himself/herself, such as when the installation position of the container 300 is inappropriate, while Level 2 is an error state including an operation that requires access to the inside of the device and cannot be handled by the user himself/herself.

Figure 11:
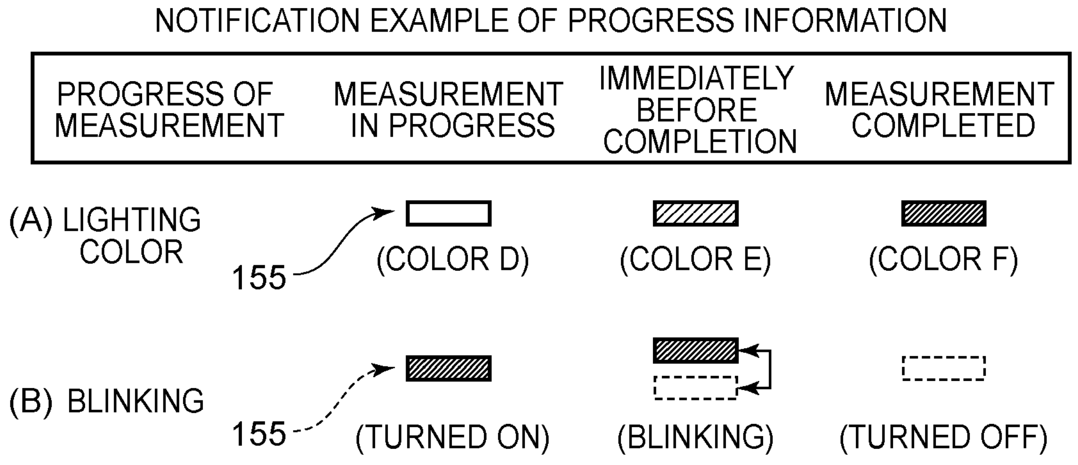
FIG. 11 is a schematic view illustrating an example A of notifying progress information with lighting colors and an example B of notifying the progress information with lighting and blinking.

In an example of FIG. 11, the notification unit 155 notifies the progress of measurement by the measurement unit 40. Thus, the user can keep track of the progress of the measurement or the time remaining before completion of measurement, through the notification unit 155. Therefore, the convenience for the user handling the sample measurement device 100 is enhanced.

FIG. 11A illustrates an example where the state is notified by the color of light. The notification unit 155 displays a state of measurement in progress in color D, a state immediately before completion in color E, and a state of measurement completed in color F. Colors D, E, and F are different from each other, such as green, yellow, and red, for example. The state immediately before completion of measurement is, for example, a state where a predetermined proportion of time to the total time required for measurement has passed since the start of the measurement, and the predetermined proportion may be, for example, 80% to 90%.

FIG. 11B illustrates an example where the state is notified by light emission and light blinking. The notification unit 155 displays the state of measurement in progress by a continuously tuned-on state, the state immediately before completion of measurement by a blinking state, and the state of measurement completed by a turned-off state.

(Description of Operation of Sample Measurement Device)

Figure 12:
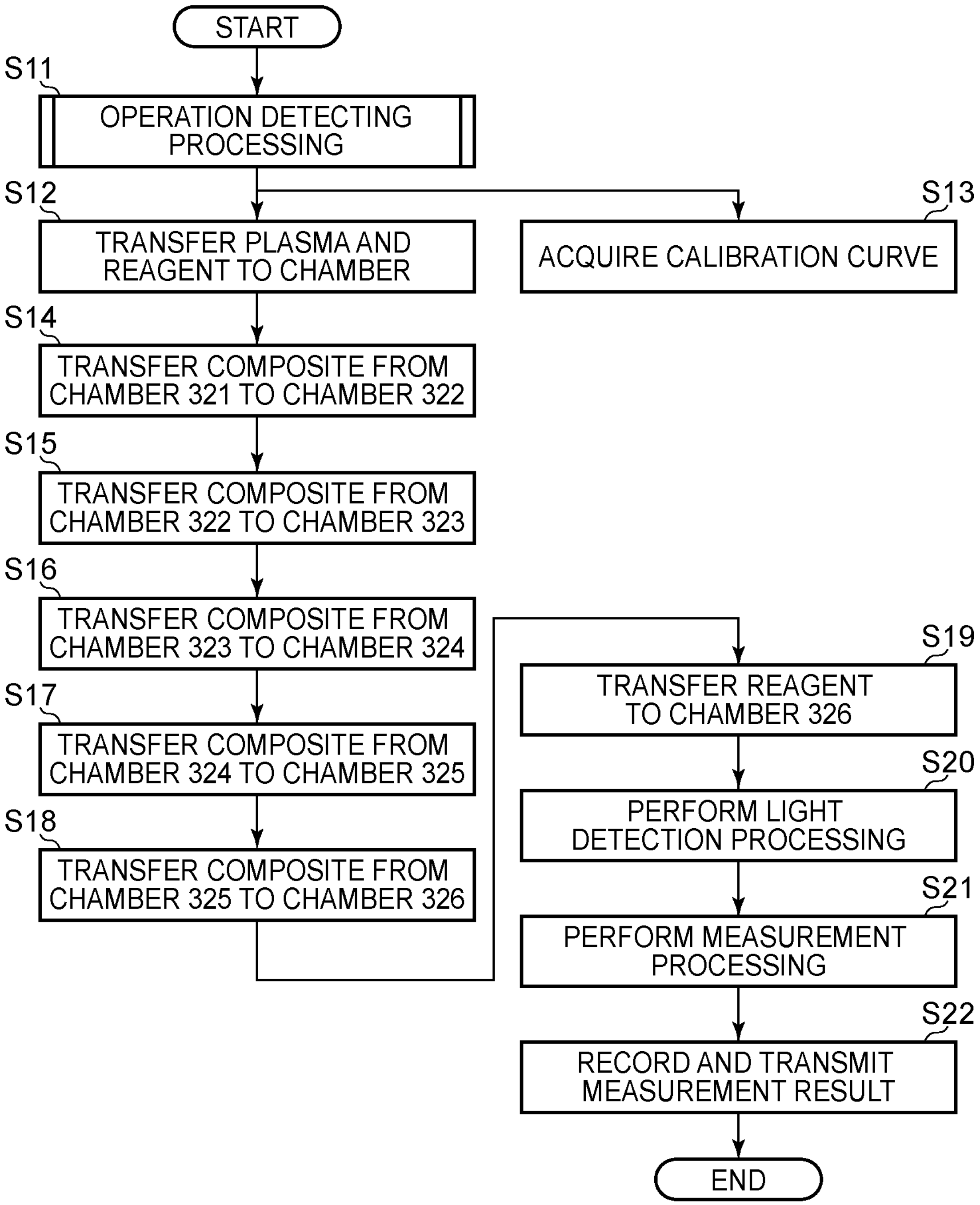
FIG. 12 is a flowchart illustrating a measurement operation of the sample measurement device.
Figure 13:
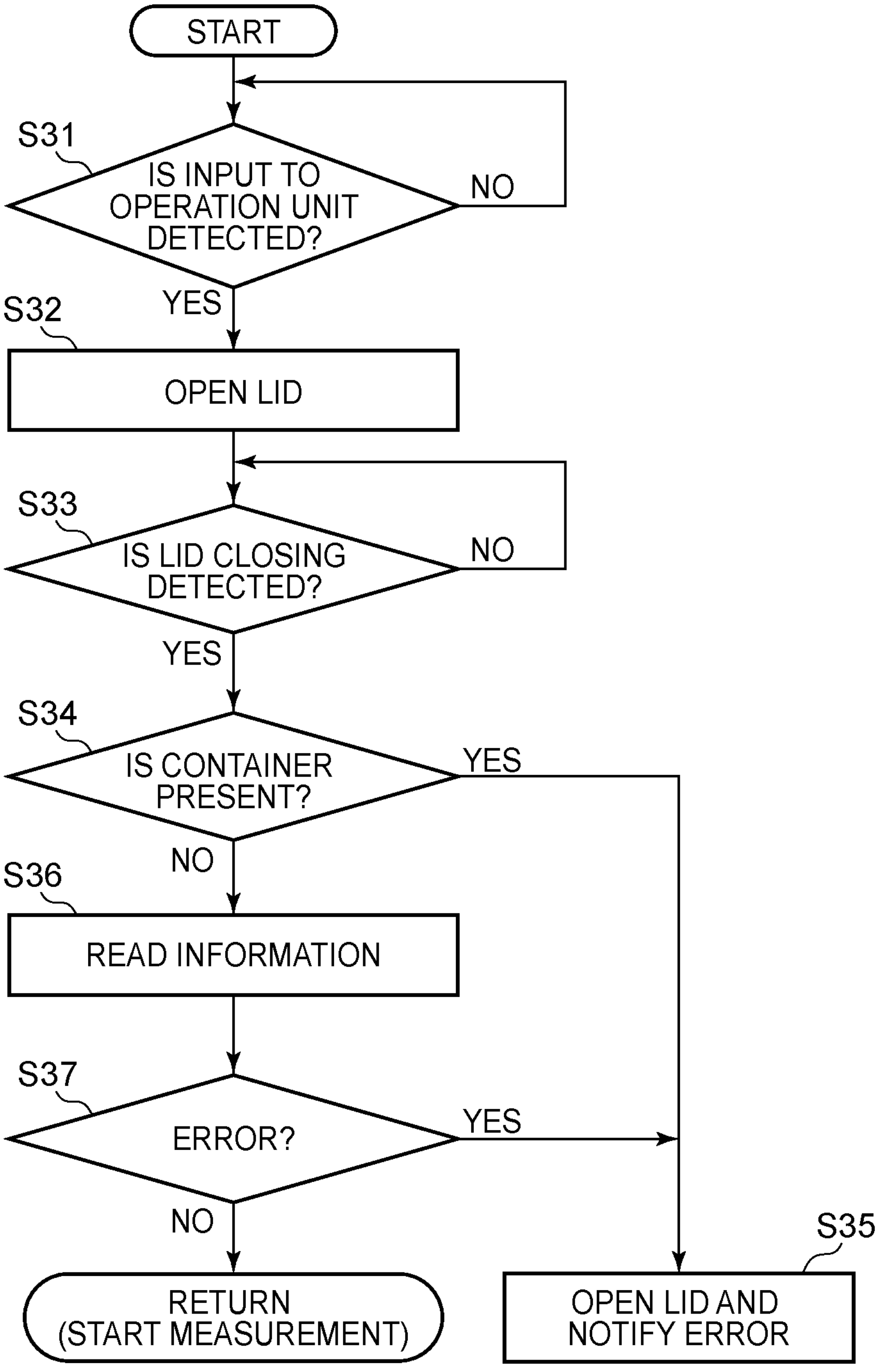
FIG. 13 is a flowchart illustrating operation detecting processing (subroutine) in FIG. 12.

Next, with reference to FIGS. 12 and 13, operations of the sample measurement device 100 are described. In the following description, FIGS. 3, 4, and 7 should be referred to for the structure of the sample measurement device 100. FIG. 5 should be referred to for the structure of the container 300.

First, a user injects a blood sample collected from a subject through the opening 341 of the container 300. A measurement example of a hepatitis B surface antigen (HBsAg) is described as an exemplary measurement item of the container 300. A test material in the blood sample contains an antigen. The antigen is a hepatitis B surface antigen (HBsAg). The test material may be one or a plurality of an antigen, an antibody, and a protein. The measurement item may be a prostatic specific antigen (PSA), thyroid stimulation hormone (TSH), thyroid hormone (FT4), or the like.

A predetermined reagent is previously housed in the housing units 311 and 312 and the chamber 321 of the container 300. To be more specific, R1 reagent is housed in the housing unit 311 positioned in the radial direction relative to the chamber 321. R2 reagent is housed in the chamber 321. R3 reagent is housed in the housing unit 311 positioned in the radial direction relative to the chamber 322. A cleaning liquid is housed in the housing unit 311 positioned in the radial direction relative to the chambers 323 to 325. R4 reagent is housed in the housing unit 311 positioned in the radial direction relative to the chamber 326. R5 reagent is housed in the housing unit 312.

In Step S11 in FIG. 12, the control unit 50 detects an operation of loading the container 300 and setting a measurable state by the user.

To be more specific, in Step S31 in FIG. 13, the control unit 50 determines whether or not an input operation to the operation unit 103 (that is, pressing of the operation unit 103) is detected. When no input operations to the operation unit 103 is detected, the control unit 50 repeats the determination until the input operation to the operation unit 103 is detected. Then, once the input operation to the operation unit 103 is detected, the control unit 50 advances to Step S32.

In Step S32, the control unit 50 opens the lid 102 by releasing locking by the lock mechanism 130. Thus, the sample measurement device 100 is set in a state where the container 300 can be loaded in the load section 20. The user sets the container 300 in the opened load section 20. In this way, at least the mechanical unit 11 is moved to set the container 300 in the load section 20 in the sample measurement device 100.

In Step S33, the control unit 50 determines whether or not it is detected by the detecting unit 12 that the lid 102 is closed. When the detecting unit 12 does not detect that the lid 102 is closed, the control unit 50 repeats the determination until it is detected that the lid 102 is closed. When it is detected that the lid 102 is closed, the control unit 50 advances to Step S34. Once the lid 102 is closed, the lock mechanism 130 locks the lid 102.

In Step S34, the control unit 50 determines whether or not the container 300 is in the load section 20. The control unit 50 also determines whether or not the container 300 is appropriately loaded in the load section 20. To be more specific, the control unit 50 checks if the container 300 exists and the container 300 is loaded at an appropriate position based on the amount of stroke of the clamper 128. When the container 300 is not loaded in the load section 20 or is not installed in an appropriate position, the control unit 50 proceeds to Step S35.

In Step S35, the control unit 50 causes the notification unit 155 to notify an error state. In this event, the control unit 50 opens the lid 102 by releasing the locking by the lock mechanism 130. By notifying an error through the notification unit 155 and opening the lid 102 immediately after setting the container 300, the user can more surely recognize the presence of the error.

When the container 300 is appropriately loaded in the load section 20, the control unit 50 causes, in Step S36, the reader 30 to read the information 410 from the information storage part 400. To be more specific, the control unit 50 causes the rotation drive unit 41 to rotate the information storage part 400 such that the information storage part 400 is positioned within an image capturing field of the reader 30. The control unit 50 causes the illumination unit 31 to emit illumination light, and allows the reader 30 to capture an image of a two-dimensional code as the information storage part 400. From the captured image, the control unit 50 acquires the reagent-related information 411 as the information 410 on the reagent housed in the container 300, the measurement item specifying information 412, and the container ID as the information 413 specifying the container 300.

In Step S37, the control unit 50 determines whether or not there is an error before measurement is started. For example, when the information 410 cannot be read from the information storage part 400 in Step S36, the control unit 50 advances to Step S35 to notify an error state through the notification unit 155 and open the lid 102.

When it is determined in Step S37 that there is no error before the start of measurement, the control unit 50 advances to Step S12 in FIG. 12 to start measurement by the measurement unit 40.

In this way, the control unit 50 controls the measurement unit 40 such that starting of measurement is suspended and prohibited until the information 410 is acquired from the container 300. More specifically, the reader 30 always reads information before measurement is started. Thus, the information 410 on the reagent housed in the container 300 can be surely acquired. As a result, appropriate measurement can be performed based on the reagent information.

Moreover, in the example of FIG. 13, when the container 300 is not loaded in the load section 20 in Step S35 after detecting the second operation (Step S33) as described above, the control unit 50 does not cause the reader 30 to read the information 410 from the information storage part 400. This can prevent the user from oblivion to load the container 300.

In FIG. 12, the control unit 50 starts the measurement operation by the measurement unit 40 in Step S12 and the following steps. The measurement operation differs in reaction time between the sample and the reagent, or the like depending on the measurement item. Therefore, the sample measurement device 100 stores a measurement operation pattern for each measurement item in the storage unit 151. The control unit 50 controls the measurement unit 40 based on the measurement item specifying information 412 for the sample. Thus, particularly when the sample measurement device 100 can perform measurement of several kinds of measurement items by using several kinds of containers 300, the measurement can be performed through measurement operations appropriate for the measurement items.

At the same time, the control unit 50 acquires a calibration curve 416 in Step S13. Here, the control unit 50 transmits, through the communication unit 152, the reagent-related information 411 to the terminal 500 or the server 600 in FIG. 9, specifies the calibration curve 416 for measurement using a reagent specified by the reagent-related information 411, and requests transmission of calibration curve 416 data. In response to the terminal 500 or the server 600, the control unit 50 acquires the specified calibration curve 416 through the communication unit 152. Note that the processing of acquiring the calibration curve 416 in Step S13 may be executed at any timing as long as the execution thereof is completed before measurement processing in Step S21 to be described later after the reading of the information.

In Step S12, the control unit 50 performs processing of transferring plasma and the reagent to the chamber. To be more specific, the control unit 50 positions the container 300 through the rotation drive unit 41, and drives the plug opening unit 43 to open the sealing body 350 in each of the six housing units 311. The control unit 50 rotates the container 300 through the rotation drive unit 41 to transfer the plasma to the chamber 321 through the channel 343, and transfers the reagents housed in the six housing units 311 to the chambers 321 to 326 by centrifugal force. Accordingly, the plasma, R1 reagent, and R2 reagent are mixed in the chamber 321. R3 reagent is transferred to the chamber 322, a cleaning liquid is transferred to the chambers 323 to 325, and R4 reagent is transferred to the chamber 326.

Once the transfer of the plasma and the reagents is completed in Step S12, the control unit 50 performs agitation processing by intermittently driving the rotation drive unit 41 to rotate the container 300. Thus, the liquid in each of the chambers 321 to 326 is agitated. Such agitation processing is performed not only in Step S12 but similarly performed after the transfer processing in Steps S14 to S19.

Here, R1 reagent contains a capturing material to be connected with the test material. The capturing material contains, for example, an antibody to be connected with the test material. The antibody is, for example, a biotin-coupled HBs monoclonal antibody. R2 reagent contains magnetic particles in a liquid component. The magnetic particles are, for example, streptavidin coupled magnetic particles each having a surface coated with avidin. In Step S12, when the plasma, R1 reagent, and R2 reagent are mixed and the agitation processing is performed, the test material and R1 reagent are connected with each other through antigen-antibody reaction. Then, the test material connected with the capturing material of R1 reagent is connected with the magnetic particles through the capturing material by reaction between the antigen-antibody reaction body and the magnetic particles. As a result, a composite in which the test material and the magnetic particles are connected with each other is generated.

Next, in Step S14, the control unit 50 transfers the composite in the chamber 321 to the chamber 322.

In transferring the composite, the control unit 50 drives the magnet drive unit 42 to gather the composite spread in the chamber 321 by bringing the magnet 123 close to the container 300. The control unit 50 transfers the composite to the chamber 322 along the channel 330 in the order of radially inward movement through a path P1, circumferential movement through a path P2, and radially outward movement through a path P3 in FIG. 5 by combining radial movement of the magnet 123 by driving the magnet drive unit 42 with circumferential movement of the container 300 by the rotation drive unit 41. The control unit 50 performs the agitation processing after transferring the composite. Note that transfer of the composite to each of the chambers 323 to 326 is performed by the same method, and thus detailed description thereof is omitted.

Thus, the composite generated in the chamber 321 is mixed with R3 reagent in the chamber 322. R3 reagent contains a labeling material. The labeling material contains a capturing material to be differentially connected with the test material, and a label. For example, the labeling material is a labeling antibody in which an antibody is used as the capturing material. In Step S14, the composite generated in the chamber 321 is mixed with R3 reagent, and the agitation processing is performed. Then, the composite generated in the chamber 321 reacts with the labeling antibody contained in R3 reagent. As a result, a composite in which the test material, the capturing antibody, the magnetic particles, and the labeling antibody are connected with each other is generated.

In Step S15, the control unit 50 transfers the composite in the chamber 322 to the chamber 323. Thus, the composite generated in the chamber 322 is mixed with the cleaning liquid in the chamber 323. When the composite generated in the chamber 322 is mixed with the cleaning liquid and agitation processing is performed in Step S15, the composite is separated from any unreacted material in the chamber 323. In other words, the unreacted material is removed by cleaning in the chamber 323.

In Step S16, the control unit 50 transfers the composite in the chamber 323 to the chamber 324. Thus, the composite generated in the chamber 322 is mixed with the cleaning liquid in the chamber 324. In the chamber 324, again, any unreacted material is removed by cleaning.

In Step S17, the control unit 50 transfers the composite in the chamber 324 to the chamber 325. Thus, the composite generated in the chamber 322 is mixed with the cleaning liquid in the chamber 325. In the chamber 325, again, any unreacted material is removed by cleaning.

In Step S18, the control unit 50 transfers the composite in the chamber 325 to the chamber 326. Thus, the composite generated in the chamber 322 is mixed with R4 reagent in the chamber 326. Here, R4 reagent is a reagent for dispersing the composite generated in the chamber 322. R4 reagent is, for example, a buffer solution. When the composite generated in the chamber 322 is mixed with R4 reagent and agitation processing is performed in Step S18, the composite generated in Chamber 322 is dispersed.

In Step S19, the control unit 50 transfers R5 reagent to the chamber 326. To be more specific, the control unit 50 positions the container 300 through the rotation drive unit 41, and drives the plug opening unit 43 to open the sealing body 350 of the housing unit 312. The control unit 50 rotates the container 300 through the rotation drive unit 41 to transfer R5 reagent housed in the housing unit 312 to the chamber 326 by centrifugal force. Accordingly, in the chamber 326, R5 reagent is further mixed into the mixture generated in Step S18.

Here, R5 reagent is a luminescent reagent containing a luminescent substrate that emits light by reaction with the labeling antibody connected with the composite. In Step S19, when the mixture generated in Step S18 is mixed with additionally transferred R5 reagent and subjected to agitation processing, a specimen is prepared. The specimen chemically emits light through reaction between the luminescent substrate and the labeling material connected with the composite.

In Step S20, the control unit 50 positions the chamber 326 directly above the light receiving unit of the light detection unit 46 through the rotation drive unit 41, and detects, through the light detection unit 46, light emitted from the chamber 326. In Step S21, the control unit 50 performs measurement processing related to immunity based on the light detected by the light detection unit 46. The light detection unit 46 counts photons at a constant interval, and outputs a count value. The control unit 50 measures the existence, amount, and the like of the test material based on the count value outputted from the light detection unit 46 and the calibration curve 416 acquired in Step S13, and generates a measurement result.

Once the measurement result is obtained, in Step S22, the control unit 50 records, as measurement result data, in the storage unit 151, the measurement result in association with the execution date and time of the measurement and the container ID that specifies the container 300. The control unit 50 also causes the transmitter 153 to transmit the measurement result data to the terminal 500 or the server 600.

Accordingly, the measurement operation of the sample measurement device 100 is completed.

Note that, in the above-described measurement operation, chemiluminescence indicates light emitted by using energy due to chemical reaction, and is, for example, light emitted when a molecule returns to the ground state after being excited into an excited state through chemical reaction. Chemiluminescence can be generated, for example, through reaction between an enzyme and a substrate, through application of an electrochemical stimulus to a labeling material, based on a luminescent oxygen channeling immunoassay (LOCI) method, or based on bioluminescence. In a first embodiment, any chemiluminescence may be employed. The test material may be connected with a material that emits fluorescence when irradiated with light having a predetermined wavelength, thereby forming a composite. In this case, a light source is provided to irradiate the chamber 326 with light. A light detector detects fluorescence emitted from a material connected with the composite by light from the light source.

Note that the magnetic particle may be a particle that contains a material having magnetism as a substrate and is used for normal immunoassay. For example, the magnetic particle may contain $Fe_2O_3$ and/or $Fe_3O_4$, cobalt, nickel, phyllite, magnetite, or the like as a substrate. The magnetic particle may be coated with a connection material for connection with the test material, or may be connected with the test material through a capturing material for connection between the magnetic particle and the test material. The capturing material is, for example, an antigen or antibody that mutually connects with the magnetic particle and the test material.

The capturing material is not particularly limited, but may be any material that is differentially connected with the test material. For example, the capturing material is connected with the test material by antigen-antibody reaction. More specifically, the capturing material is an antibody, but when the test material is an antibody, the capturing material may be an antigen of the antibody. When the test material is a nucleic acid, the capturing material may be a nucleic acid complementary with the test material. Examples of the label included in the labeling material include an enzyme, a fluorescent substance, a radioactive isotope, and the like. Examples of the enzyme include, alkaline phosphatase (ALP), peroxidase, glucose oxidase, tyrosinase, acid phosphatase, and the like. When the chemiluminescence is electrochemiluminescence, the label may be any material that emits light by an electrochemical stimulus, and is, for example, a ruthenium complex. Examples of the fluorescent substance include fluorescein isothiocyanate (FITC), green fluorescence protein (GFP), luciferin, and the like. Examples of the radioactive isotope include 125I, 14C, 32P, and the like.

When the label is an enzyme, a well-known luminescent substrate may be selected as a luminescent substrate for the enzyme as appropriate in accordance with the used enzyme. For example, when the enzyme is alkaline phosphatase, examples of the luminescent substrate include: chemiluminescence substrates such as CDP-Star (registered trademark), (4-chloroauric-3-(methoxyspiro [1,2-dioxetane-3,2'-(5'-chloroauric) tricyclo [3.3.1.13,7] decane]-4-yl) phenylphosphate 2 sodium), and CSPD (registered trademark) (3-(4-methoxyspiro [1,2-dioxetane-3,2-(5'-chloroauric) tricyclo [3.3.1.13,7] decane]-4-yl) phenylphosphate 2 sodium); luminescent substrates such as p-nitrophenylphosphate, 5-bromo-4-chloroauric-3-indolylphosphate (BCIP), 4-nitroblue tetra zolium chloride (NBT), and iodine nitro tetra zolium (INT); a fluorescence substrate such as 4-methylumbelliphenyl phosphate (4MUP); and coloring substrates such as 5-bromo-4-chloroauric-3-indolylphosphate (BCIP), 5-bromo-6-chloroauric-indolylphosphate 2 sodium, and p-nitrophenylphosphate.

Figure 14:
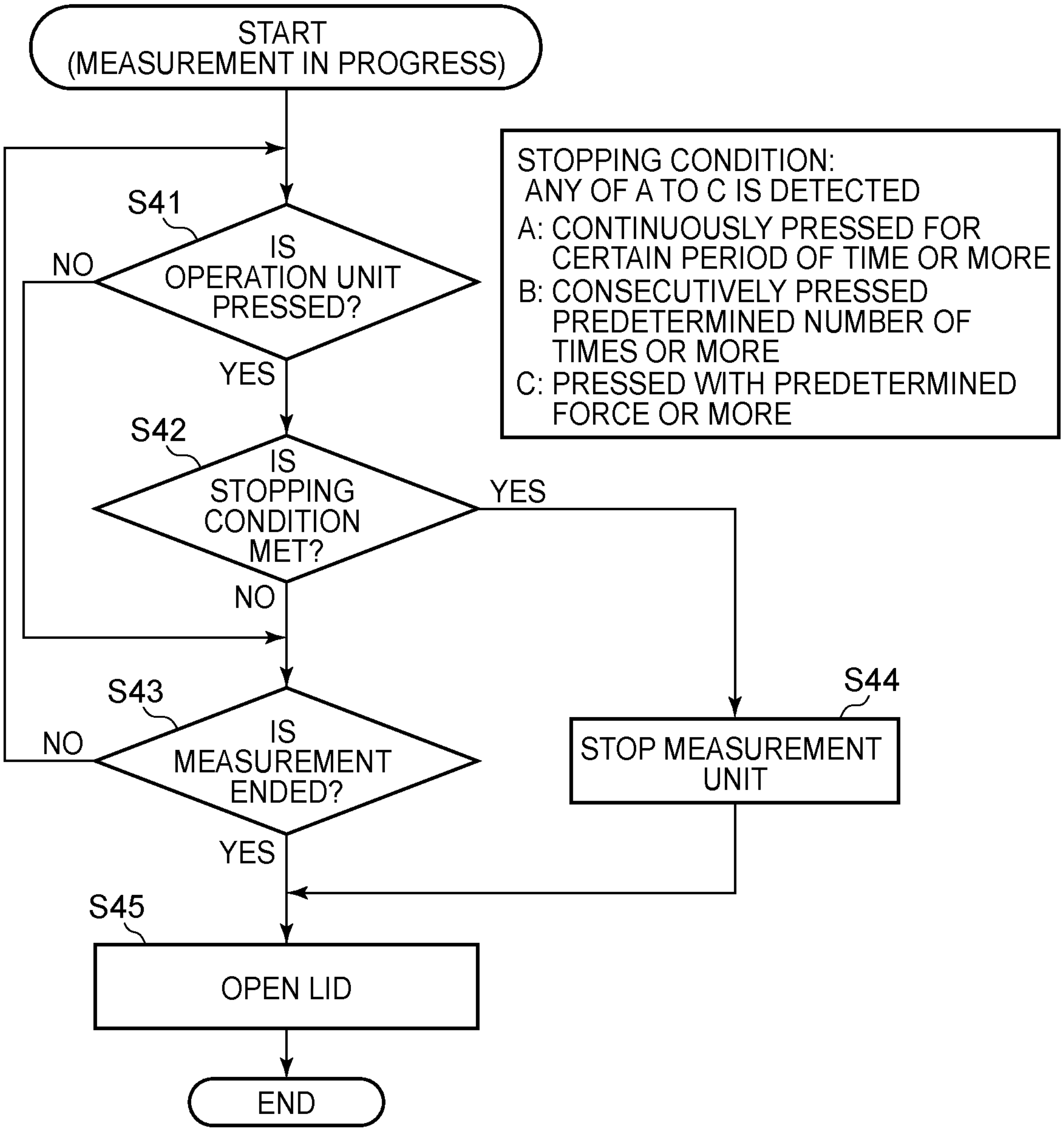
FIG. 14 is a flowchart illustrating an operation in response to a button operation during measurement.

Next, with reference to FIG. 14, description is given of reception of an operation by the user to the sample measurement device 100 during measurement.

In an example of FIG. 14, the control unit 50 performs control to stop the measurement when a specific operation is performed to the operation unit 103 in a state where the container 300 is loaded in the load section 20 and the lid 102 is closed. More specifically, when a specific operation is performed to a button as the operation unit 103, the measurement is suspended or stopped. Accordingly, the operation unit 103 can be used not only to input an operation for setting a state where the container 300 can be loaded in the load section 20, but also to suspend or stop the measurement during measurement. Therefore, the operations when using the device can be simplified by suppressing an increase in the number of the operation units.

To be more specific, the control unit 50 determines in Step S41 whether or not the operation unit 103 is pressed during the measurement operation. When no pressing of the operation unit 103 is detected, the control unit 50 advances the processing to Step S43. When pressing of the operation unit 103 is detected, the control unit 50 advances the processing to Step S42.

In Step S42, the control unit 50 determines whether or not the pressing of the operation unit 103 meets a stopping condition. In other words, the control unit 50 determines whether or not a pressing operation set as a specific operation to the operation unit 103 is detected.

To be more specific, the specific operation is set as any of (A) continuously pressing a button of the operation unit 103 for a certain period of time or more (B) consecutively pressing the operation unit 103 more than once, and (C) pressing the operation unit 103 hard with force at a given pressure or more. A certain period of time is longer than a normal operation fixed time for opening the lid 102, and is a few seconds, for example. More than once is, for example, two or three times. As for the force at a given pressure or more, a pressing force that can be sufficiently differentiated from a standard pressing force may be used, by measuring the standard pressing force during pressing in a normal operation of opening the lid 102.

When input of any of (A) to (C) is detected as the specific operation, the control unit 50 advances the processing to Step S44. When pressing of the operation unit 103 is detected, which, however, does not correspond to the input of the specific operation, the control unit 50 advances the processing to Step S43.

In Step S43, the control unit 50 determines whether or not the measurement is completed. When the measurement is not completed, the control unit 50 returns the processing to Step S41. When the measurement is completed, the control unit 50 advances the processing to Step S45. The completion of the measurement means the completion of the processing up to at least Step S21 in FIG. 12.

On the other hand, when the input of the specific operation is detected in Step S43, the control unit 50 stops the measurement unit 40 to stop the measurement in Step S44. After the measurement is stopped, the control unit 50 advances the processing to Step S45.

In Step S45, the control unit 50 releases the locking by the lock mechanism 130, and opens the lid 102. As a result, the user can take the container 300 out of the load section 20.

As described above, in the example of FIG. 14, the control unit 50 stops the measurement when it is detected that the operation unit 103 is continuously pressed for a certain period of time or more, that the operation unit 103 is consecutively pressed more than once, or that the operation unit 103 is pressed hard with force at a given pressure or more, in the state where the container 300 is loaded in the load section 20 and the lid 102, the mechanical unit 11 that can be opened and closed so as to enclose the container 300 in the housing 10, is closed. Thus, the measurement can be stopped with a simple operation to the operation unit 103.

When the measurement is completed in Step S43 as described above, the control unit 50 performs control to open the lid 102 in Step S45. Thus, the user can easily take out the container 300 after the completion of the measurement. Furthermore, the completion of the measurement can be notified to the user by opening the lid 102. This can prevent the user from forgetting to take out the container 300.

Note that FIG. 14 illustrates the example where the measurement is stopped when the specific operation to the operation unit 103 is inputted. The measurement may be suspended when a specific operation to the operation unit 103 is inputted. For suspending the measurement, the control unit 50 opens the lid 102 after stopping the measurement unit 40 in Step S44, restarts the measurement operation by the measurement unit 40 when it is detected that the lid 102 is closed, and also returns the processing to Step S43. The control unit 50 waits until the lid 102 is closed. With this configuration, the measurement can be suspended when a specific operation to the operation unit 103 is inputted.

(Modified Example of Acquisition of Calibration Curve)

Figure 15:
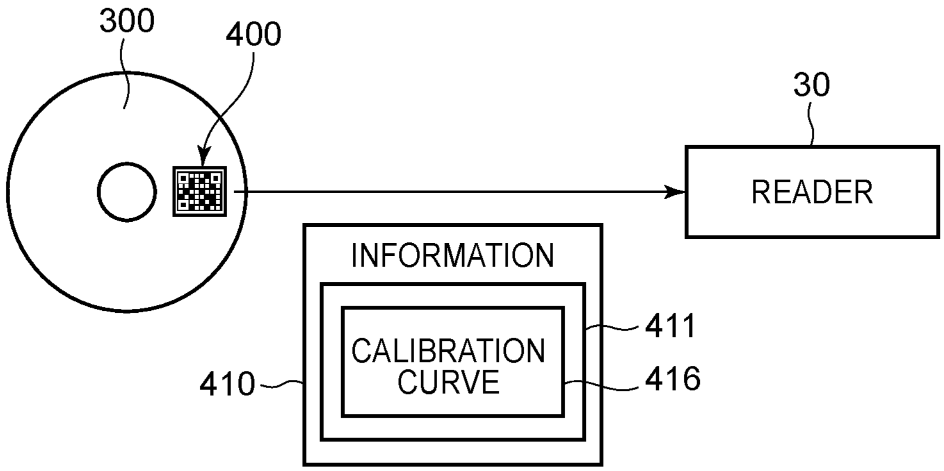
FIG. 15 is a schematic view illustrating an example of reading a calibration curve from the information storage part.

FIG. 9 illustrates the example where the calibration curve 416 is acquired from the terminal 500 or the server 600, based on the reagent-related information 411 as the information 410. On the other hand, in an example of FIG. 15, the reagent-related information 411 further includes a calibration curve 416 of the measurement item. More specifically, the calibration curve 416 is registered in the information storage part 400 and read by the reader 30, in the same manner as the agent-related information 411, the measurement item specifying information 412, and the information 414 that specifies the container 300. Thus, in measurement using a reagent in the container 300, a measurement result can be measured by using the calibration curve 416. The calibration curve 416 may differ depending on the reagent. Therefore, an appropriate measurement result can be obtained without creating a calibration curve 416 for measurement, by recording in the information storage part 400 a calibration curve 416 for the reagent housed in the container 300.

(Modified Example of Mechanical Unit)

Figure 16:
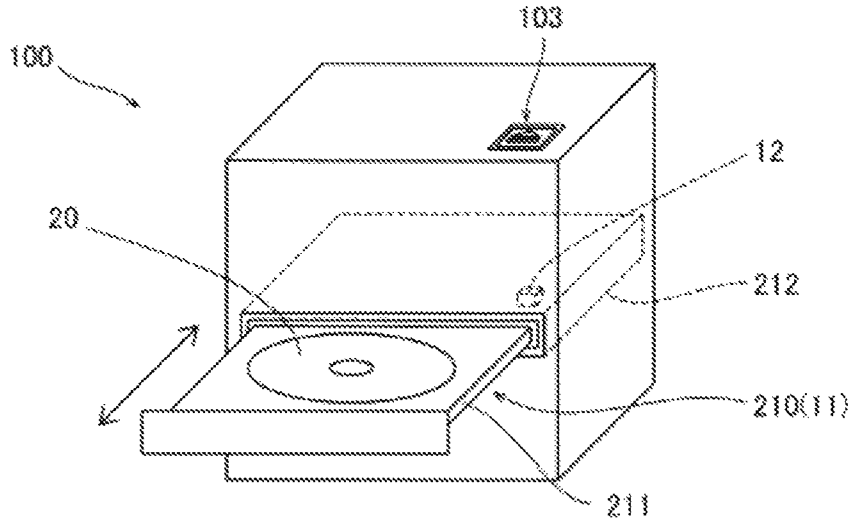
FIG. 16 is a diagram illustrating an example where a mechanical unit provided in a housing is a tray.

FIG. 3 illustrates the example where the mechanical unit 11 is the lid 102 covering the load section 20. In FIG. 16, the mechanical unit 11 includes a tray 211 that moves the load section 20 into and out of the housing 10, and the detecting unit 12 detected that the load section 20 is moved into the housing 10 by the tray 211 so that the container 300 is shielded from light. To be more specific, a loader 210 is provided, which includes the tray 211 having the load section 20 provided therein. A loader drive unit 212 provided in the housing 10 moves the tray 211 between a protruding position outside the housing 10 and a measurement position inside the housing 10. At the protruding position, the user can load the container 300 in the load section 20 in the tray 211 or take out the container 300 out of the load section 20. At the measurement position, the container 300 is shielded from light, thereby enabling a measurement operation to be operated by the measurement unit 40 for the container 300 on the load section 20.

In a first configuration example of FIG. 16, the tray 211 at the measurement position is moved to the protruding position by an operation of pressing the operation unit 103, and the tray 211 at the protruding position is moved to the measurement position by an operation of pressing the operation unit 103. Therefore, by a first operation of pressing the operation unit 103 when the tray 211 is at the measurement position, the tray 211 is moved to set a state where the container 300 can be loaded in the load section 20. Then, by a second operation of pressing the operation unit 103 when the tray 211 is at the protruding position, the tray 211 is moved to set a measurable state with the container 300 shielded from light. The detecting unit 12 detects that the load section 20 is moved into the housing 10 by the loader 210 so as to set the measurable state using the container 300. In response to the detection by the detecting unit 12, the control unit 50 allows the information to be read from the information storage part 400 and the measurement to be started.

In a second configuration example of FIG. 16, a first operation is an operation of pressing the operation unit 103, while a second operation is an operation of pushing the loader 210 at the protruding position toward the measurement position. In response to detection of the first operation of pressing the operation unit 103, the control unit 50 moves the tray 211 to the protruding position such that the load section 20 is ready for loading of the container 300. When the user performs the second operation of loading the container 300 and pushing the loader 210, the control unit 50 moves the tray 211 to the measurement position to set a measurable state using the container 300. The detecting unit 12 detects that the tray 211 is moved to the measurement position. In response to the detection by the detecting unit 12, the control unit 50 allows the information to be read from the information storage part 400 and the measurement to be started.

In a sample measuring method according to the configuration example of FIG. 16, the tray 211 in the sample measurement device 100 is ejected and the container 300 is loaded. Then, the tray 211 is closed to shield light from the container 300. Thereafter, based on the closing of the tray 211, reading of the information 410 from the container 300 is started.

Accordingly, in the first and second configuration examples of FIG. 16, the user can start the measurement with a very simple operation of just moving the tray 211 into the housing 10 after loading the container 300 in the load section 20.

Moreover, in the first and second configuration examples of FIG. 16, once it is detected that the tray 211 capable of loading the container 300 to be shielded from light in the housing 10 is moved into the housing 10, reading of the information 410 from the information storage part 400 on the container 300 is started, and sample measurement is performed based on the information 410. Thus, the user can start the measurement with a very simple operation of just enclosing the container 300 in the housing 10 with the tray 211 after loading the container 300.

In the first and second configuration examples of FIG. 16, in response to an operation to the operation unit 103 provided in the housing 10, the tray 211 is moved out of the housing 10 so as to enable the container 300 to be loaded. Thus, unlike a case where the load section 20 is moved out of the housing 10 by operating a user interface on a display screen, for example, an operation of enabling the container 300 to be loaded can be performed directly to the operation unit 103. Therefore, the user can easily load the container 300 without performing a cumbersome operation of the user interface on the display screen.

Note that, in FIG. 16, again, upon completion of the measurement, the control unit 50 controls the loader 210 so as to move the load section 20 out of the housing 10. That is, upon completion of the measurement, the tray 211 is moved out of the housing 10. Accordingly, the load section 20 is moved out of the housing 10, and thus the user can recognize the completion of the measurement. This can also prevent the user from forgetting to take out the container 300.

Figure 26:
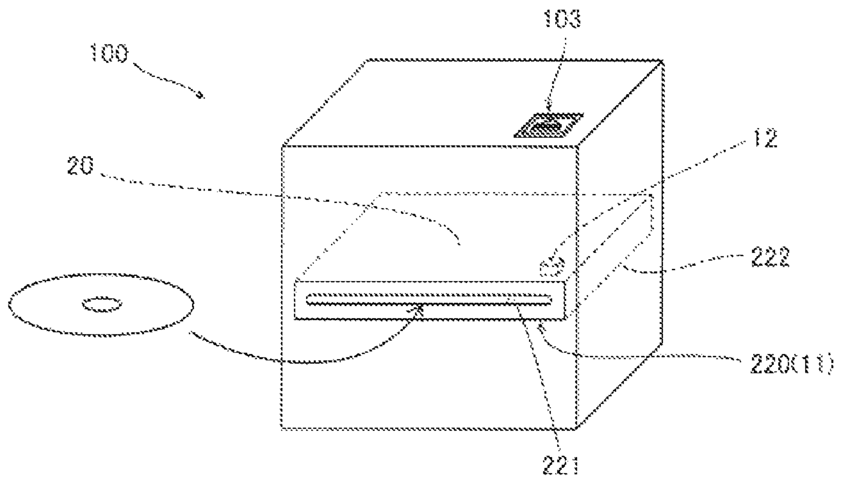
FIG. 26 is a diagram illustrating another example where the mechanical unit provided in the housing is a loader mechanism.
Figure 27:
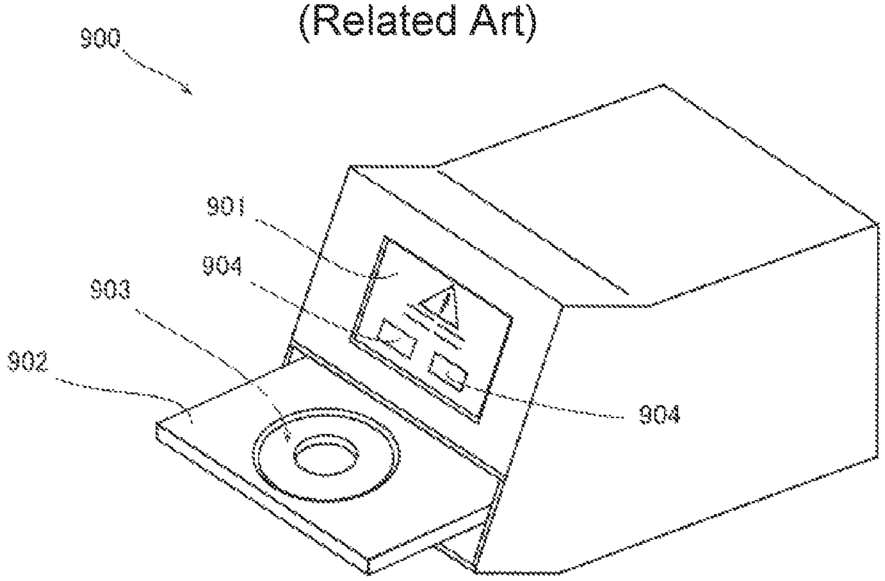
FIG. 27 is a diagram illustrating a related art.

FIG. 16 illustrates the example of the loader 210 that moves the tray 211 into and out of the housing 10. FIG. 26 illustrates a slot-in type loader 220 provided with no tray 211. In FIG. 26, the mechanical unit 11 includes an opening 221 provided in the housing 10 and the loader 220 that moves a container 300 into the housing 10, the container 300 being inserted into the opening 221. The detecting unit 12 detects that the container 300 is inserted into the opening 221 and the container 300 is moved to be shielded from light into the housing 10. Thus, the user can start measurement with a very simple operation of just inserting the container 300 into the opening 221.

The opening 221 is a slot into which the container 300 is inserted. The loader 220 moves the container 300 inserted through the opening 221 to the load section 20 in the housing 10 through a loader drive unit 222. Unlike FIG. 16, the loader drive unit 222 directly moves the container 300 rather than the tray 211. Upon completion of the measurement, the loader 220 moves the container 300 out of the housing 10.

In a sample measuring method according to the configuration example of FIG. 16, the container 300 is inserted into the opening 221 in the sample measurement device 100. Then, the container 300 is taken into the housing 10 of the sample measurement device 100 through the opening 221, and the container 300 is shielded from light. Thereafter, based on the taking of the container 300 into the housing 10, reading of the information 410 from the container 300 is started. Thus, the user can start the measurement with a very simple operation of just inserting the container 300 into the opening 221.

(Operation Mode)

Figure 17A:
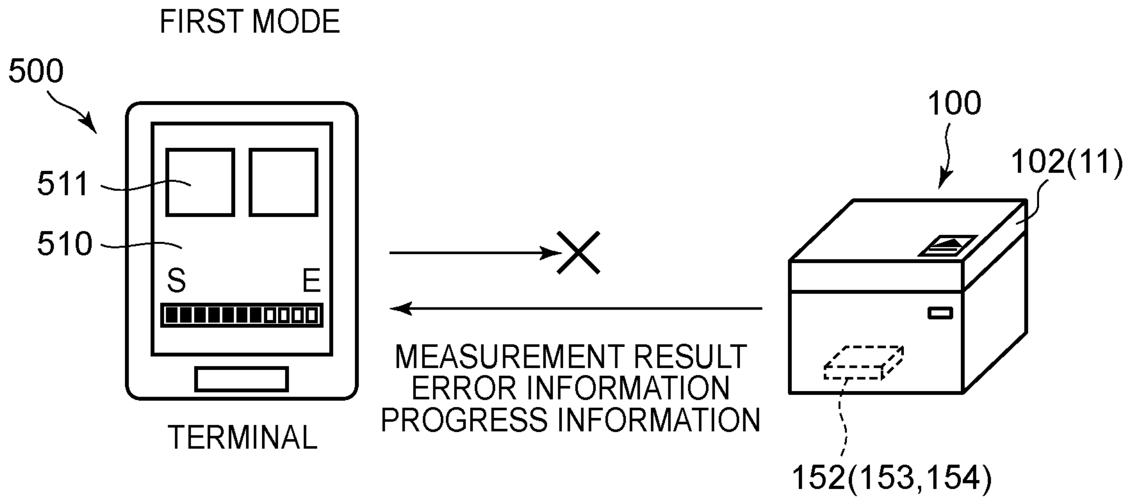
FIGS. 17A and 17B are diagrams illustrating a first mode A and a second mode B of the sample measurement device.
Figure 17B:
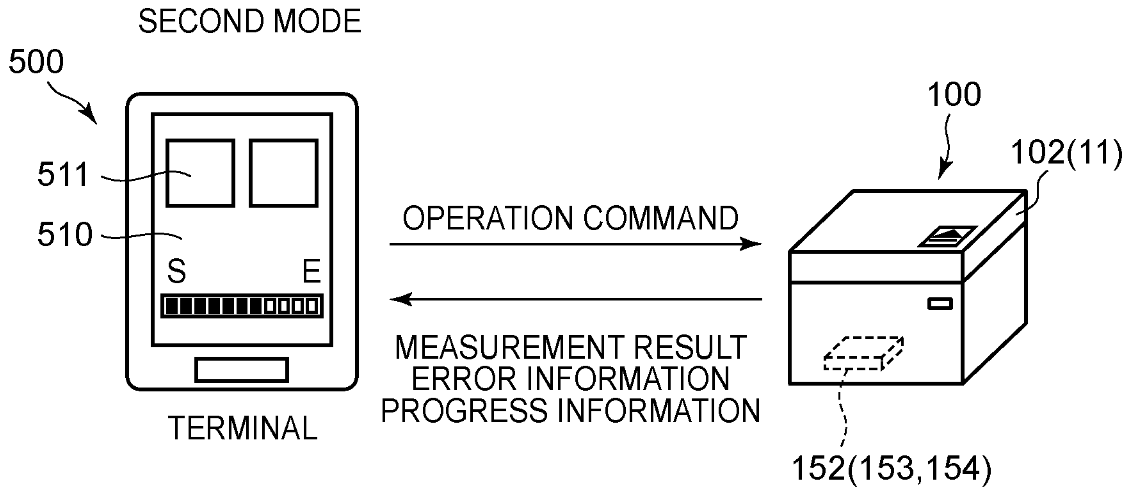

In an example of FIGS. 17A and 17B, the control unit 50 is configured to be able to select a mode from a first mode shown in FIG. 17A that disables an operation from the terminal 500 through the receiver 154 and a second mode shown in FIG. 17B that enables an operation based on a signal from the terminal 500 through the receiver 154.

As illustrated in FIG. 17A, when the first mode is selected, information reading by the reader 30 is started according to a first operation, and information reading by the reader 30 is not started even if an operation of the terminal 500 is performed. More specifically, the sample measurement device 100 starts a measurement operation in a stand-alone manner regardless of the operation of the terminal 500. In the first mode, measurement result data and error information can be transmitted to the terminal 500 by the transmitter 153. For example, the progress is transmitted to the terminal 500 and displayed on a display screen of the terminal 500. FIGS. 17A and 17B illustrate an example where the progress from the start “S” to the end “E” is displayed with a bar graph.

As illustrated in FIG. 17B, when the second mode is selected, information reading by the reader 30 is started by a first operation or an operation of the terminal 500. In the second mode, not only information reading by the reader 30 but any processing may be started by the operation of the terminal 500. That is, in the second mode, the terminal 500 can remotely operate the sample measurement device 100.

Thus, the remote operation by the terminal 500 can be performed in the second mode while the first mode of starting the measurement by closing the mechanical unit 11 is set as a basic mode. Moreover, erroneous remote operation of the device can be prevented by setting the first mode.

Note that, in FIGS. 17A and 17B, the receiver 154 is configured to be able to receive a signal based on an operation to the display screen 510 from the terminal 500 provided with the display screen 510. For example, in response to an operation to a user interface 511 for executing information reading, an information reading execution command is transmitted from the terminal 500 and received by the receiver 154. In response to the information reading execution command, the control unit 50 executes information reading by the reader 30. Thus, users experienced in operations through the user interface 511 of the terminal 500, for example, can be allowed to perform input operation through the user interface 511 of the terminal 500 in the second mode.

(Modified Example of Container)

Figure 18:
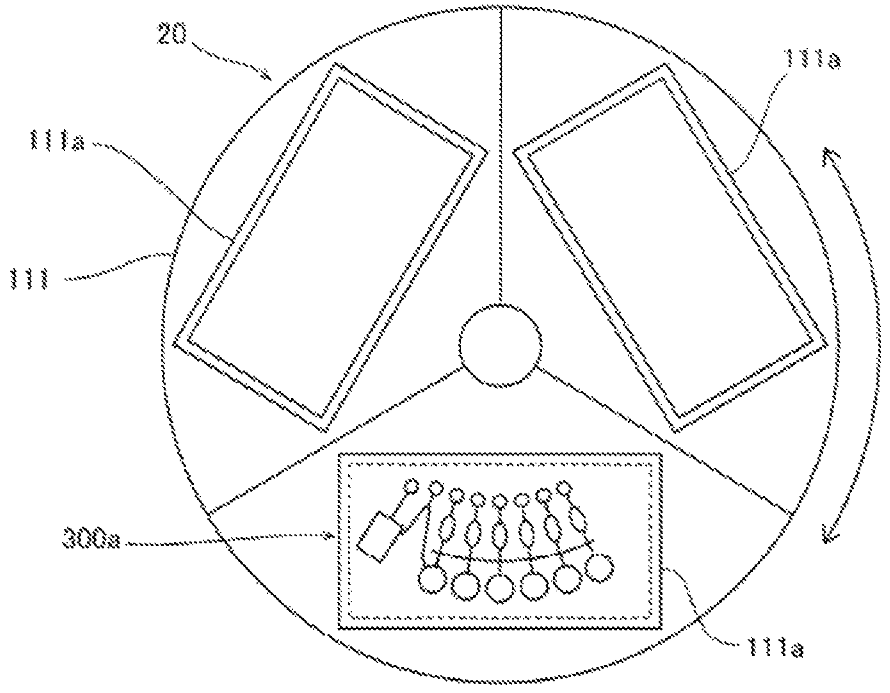
FIG. 18 is a diagram illustrating a modified example of the container.

Although FIG. 5 illustrates the example where the disk-shaped container 300 is used, FIG. 18 illustrates an example where a rectangular plate container 300*a* is used in place of the disk-shaped container 300. The other configuration is the same as the specific configuration example according to a first embodiment described above.

The support member 111 of the load section 20 includes a rectangular load region 111*a* corresponding to the container 300*a*. FIG. 18 illustrates a configuration example where three load regions 111*a* are provided in the circumferential direction of the disk-shaped support member 111. The container 300*a* is provided with the same housing units, chambers, and channels as those of the container 300 illustrated in FIG. 5. As in the case of FIG. 5, the container 300 may be provided with the information storage part 400.

To start measurement, the user injects a blood sample into the container 300 and loads the container 300*a* in the load section 20, as in the case of the container 300. Then, in response to detection by the detecting unit 12, the reader 30 reads information from the information storage part 400. In response to detection by the detecting unit 12, the control unit 50 starts measurement by the measurement unit 40. The container 300 loaded in the three load regions 111*a* may be used to perform measurement of the same measurement item or may be used to perform measurement of different measurement items. In an example of FIG. 18, the sample measurement device 100 can perform the measurement operation for up to three containers 300 at the same time.

Figure 19:
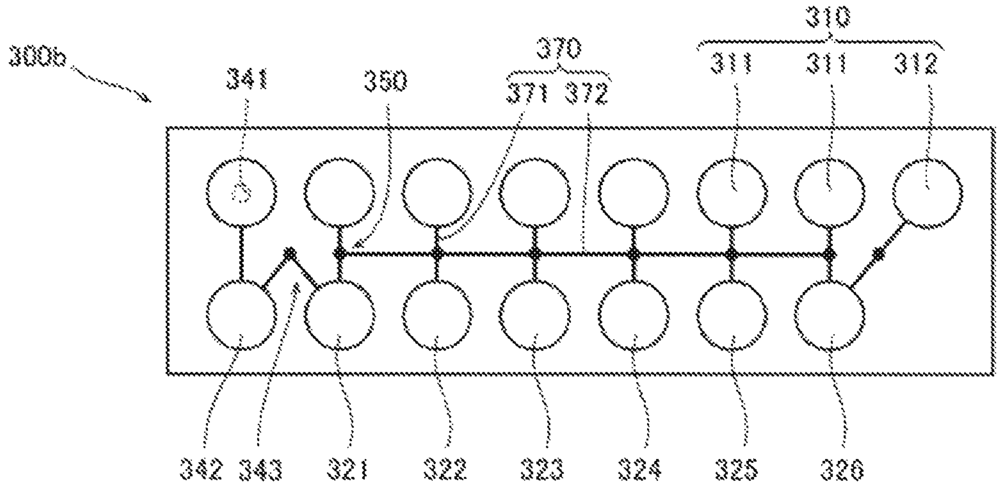
FIG. 19 is a diagram illustrating a modified example of the container.

FIG. 19 illustrates an example where a container 300*b* is a well plate. The other configuration is the same as the specific configuration example according to a first embodiment described above.

The container 300*b* includes an opening 341 for injecting a sample, a housing unit 310 that houses a reagent, chambers 321 to 326, and a channel 370. The housing unit and the chambers include wells formed in a plate-like member. The channel 370 is provided with a sealing body 350. The container 300*b* can be loaded in the same load section 20 as that illustrated in FIG. 18. In a state where the container is set in the load region 111*a* of the support member 111, channels 371 connecting the housing unit 310 to the chambers 321 to 326 extend mainly in the radial direction, and a channel 372 connecting the channels 371 to each other extends mainly in the circumferential direction. Thus, a test material connected with magnetic particles can be moved to the respective chambers 321 to 326 by combining rotation of the container 300 and radial movement of the magnet 123.

Figure 20:
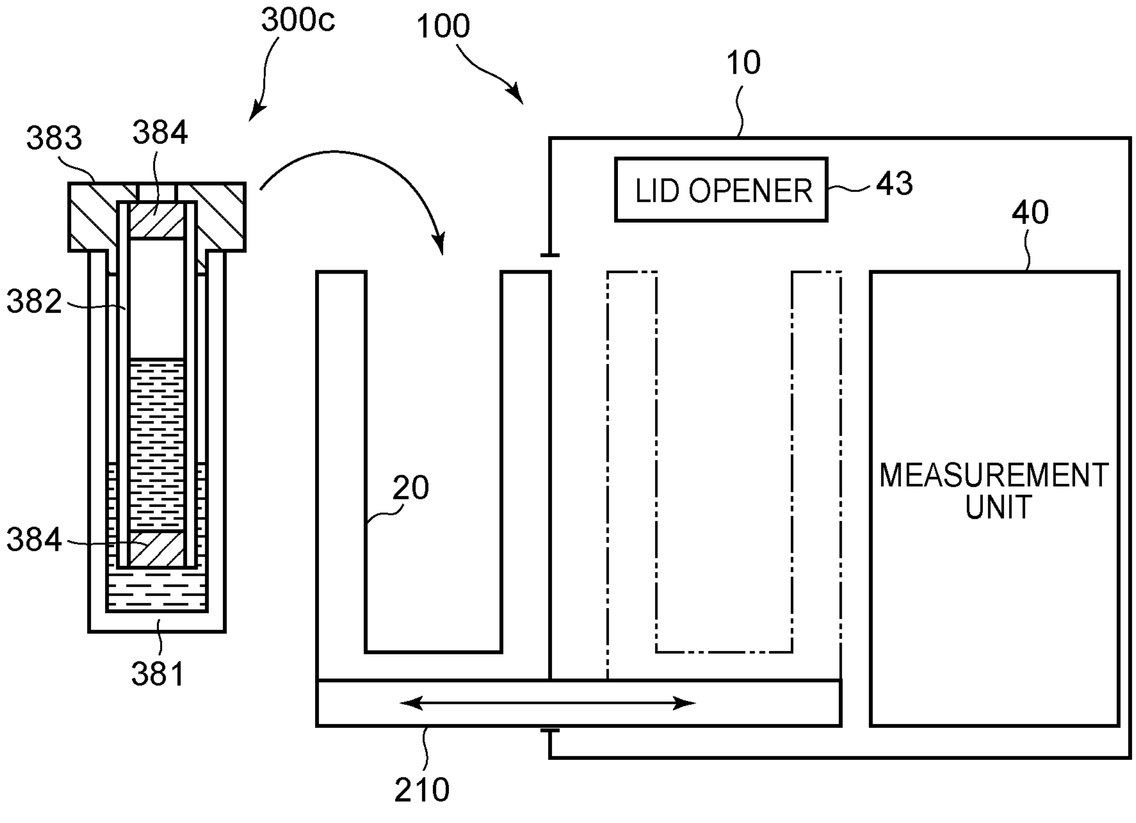
FIG. 20 is a diagram illustrating a modified example of the container.

FIG. 20 illustrates an example where a container 300*c* is a tubular container such as a cuvette.

In the example of FIG. 20, the container 300*c* has a nested structure including a tubular outside housing unit 381 and a tubular inside housing unit 382 provided in the outside housing unit 381. The outside housing unit 381 is a tubular container having its bottom closed and its top open, and a sample is injected into the outside housing unit 381 through the opening. The inside housing unit 382 is a tube having its both ends open, and the upper and lower openings are closed by sealing bodies 384, respectively. A reagent is previously housed in the sealed housing unit 382. The upper end of the housing unit 382 can be attached to a cap 383. The cap 383 is attached to the opening of the housing unit 381 to close the opening. The cap 383 has a hole provided in its center part, through which the upper sealing body 384 of the housing unit 382 is exposed.

The lower sealing body 384 is removed from the housing unit 382 by the measurement unit 40 pressing the upper sealing body 384 through the hole in the cap 383 with the plug opening unit 43. The lower sealing body 384 falls inside the housing unit 381. As a result, the reagent housed in the housing unit 382 is mixed with the sample housed in the housing unit 381. In the example of FIG. 20, the measurement unit 40 agitates the sample and the reagent housed in the housing unit 381 to achieve reaction therebetween, by mechanically vibrating the container 300*c*, by generating a temporally changing magnetic field, or the like. The measurement unit 40 detects a test material by detecting light emission caused as a result of the reaction, fluorescence generated by irradiation of excitation light, a change in color or turbidity, and the like.

The user assembles the container 300*c* by injecting a blood sample into the housing unit 381 and covering with the cap 383 attached to the housing unit 382. The user loads the container 300*c* in the load section 20 and closes the loader 210. In response to detection by the detecting unit 12, the reader 30 performs information reading from the information storage part 400. In response to detection by the detecting unit 12, the control unit 50 starts measurement by the measurement unit 40.

Second Embodiment

Figure 21:
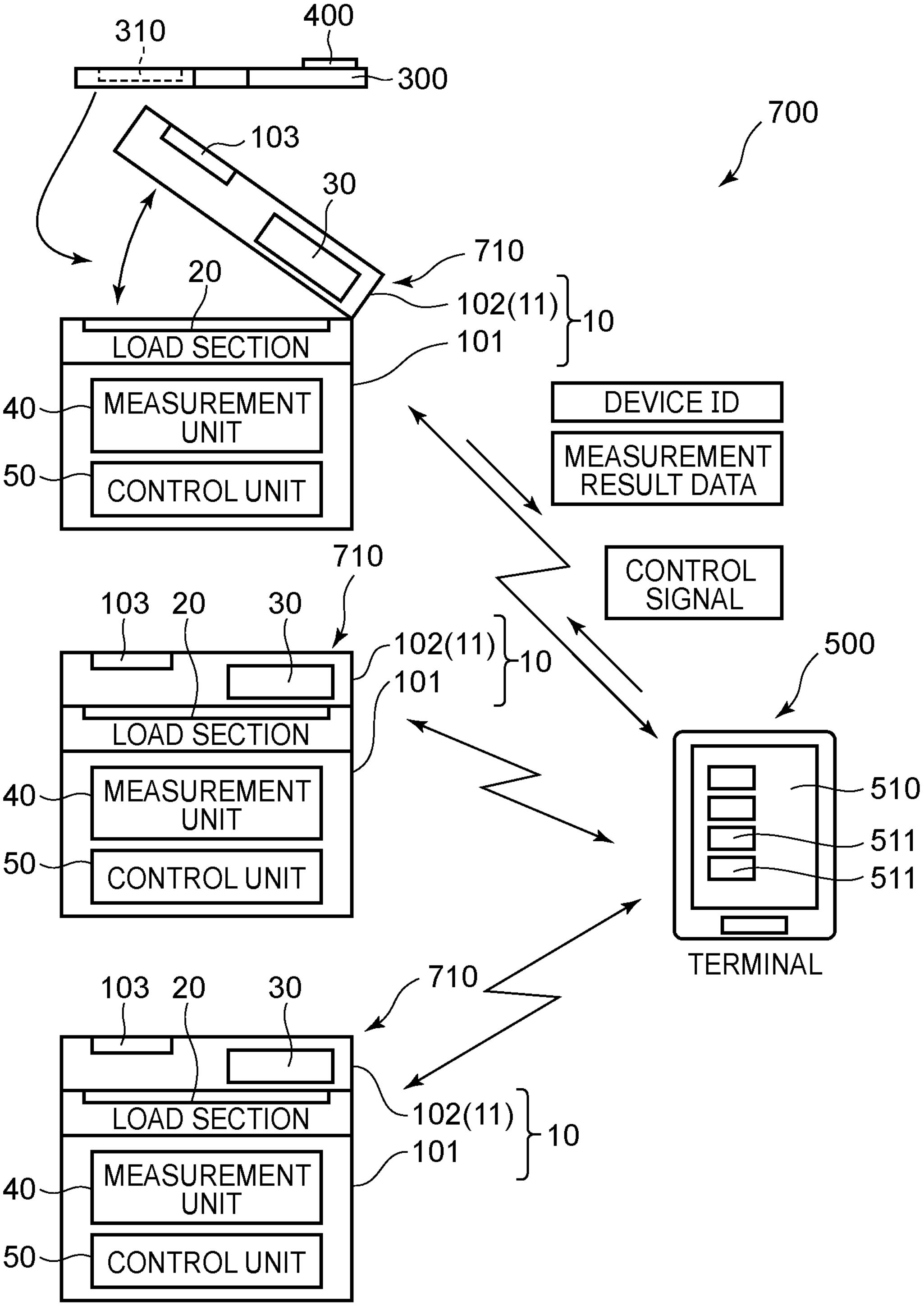
FIG. 21 is a schematic view illustrating a sample measurement device according to one or more embodiments.
Figure 22:
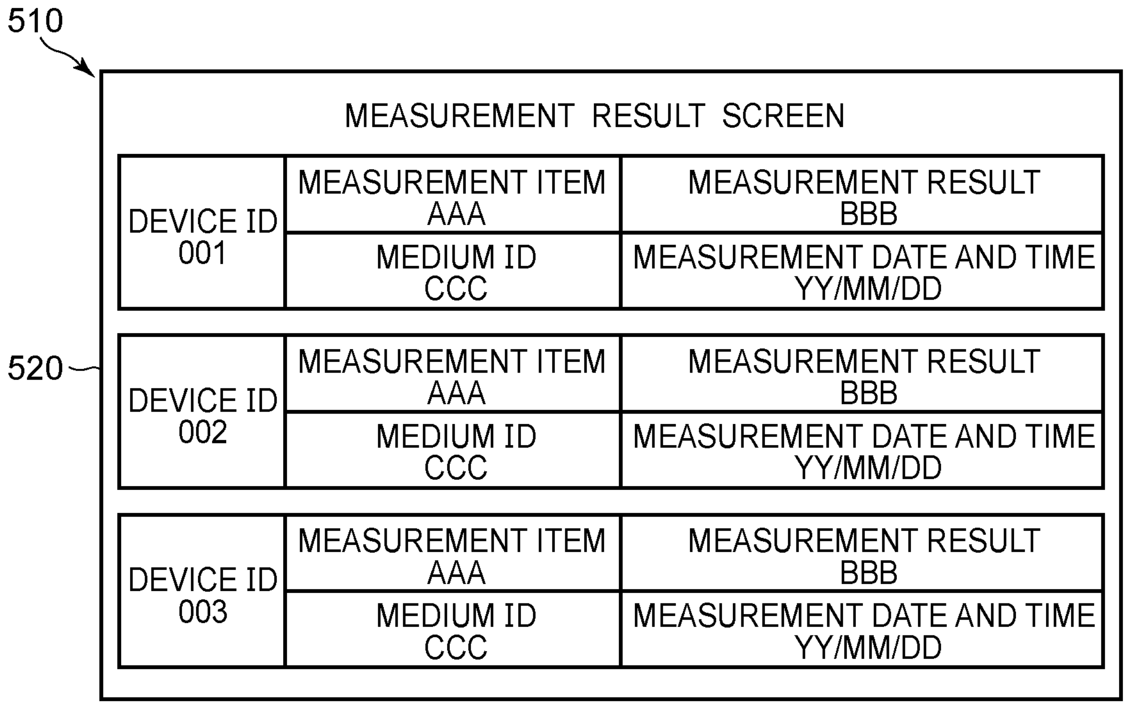
FIG. 22 is a schematic view illustrating an example of a measurement result screen displayed on a terminal.
Figure 23:
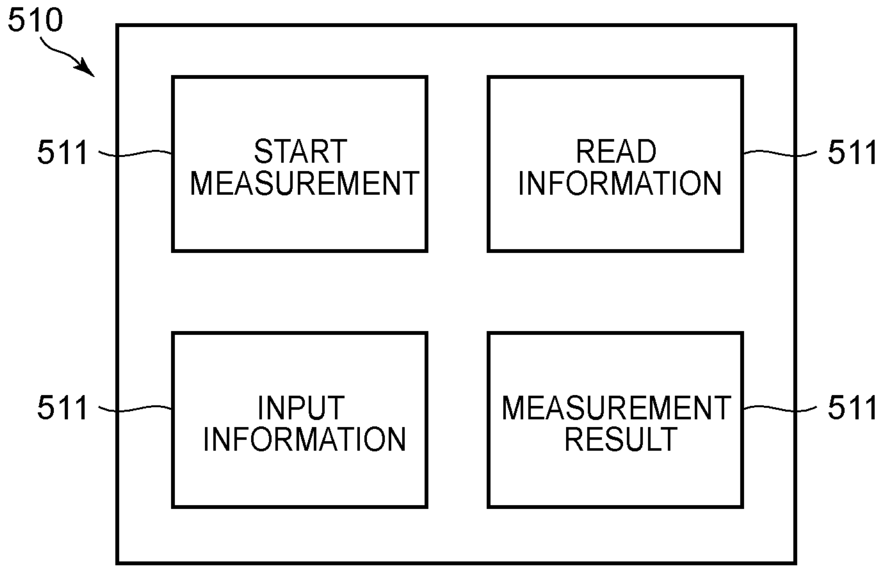
FIG. 23 is a schematic view illustrating an example of a user interface displayed on the terminal.

Next, with reference to FIGS. 21 to 23, description is given of a second embodiment illustrating an example where a system is configured by connecting the sample measurement device 100 and the terminal 500 in a first embodiment described above. Note that, as for the same configuration as that of a first embodiment, description thereof is omitted in a second embodiment.

As illustrated in FIG. 21, a sample measurement device 700 according to a second embodiment includes a terminal 500 including a display screen 510, and a device main body 710 that can be connected to the terminal 500. In a second embodiment, one or more device main bodies 710 are provided.

The terminal 500 receives an input operation by the user through a user interface 511 displayed on a display screen 510. The input operation is detected by a touch panel when a portable information terminal such as a tablet terminal or a smartphone is used, or detected through a mouse, a keyboard, or any other input instrument when a terminal such as a PC is used.

The device main body 710 has approximately the same configuration as that of the sample measurement device 100 according to a first embodiment. More specifically, the device main body 710 includes a housing 10 with a mechanical unit 11, a load section 20, a reader 30, a measurement unit 40, and a control unit 50. In the load section 20, a container 300 is loaded, which includes a housing unit 310 for housing a reagent that reacts with a sample. In the example of FIG. 21, the mechanical unit 11 includes an openable and closable lid 102 that covers the load section 20. The mechanical unit 11 may be the tray 211 illustrated in FIG. 16 or the loader 220 illustrated in FIG. 26.

In a second embodiment, the load section 20 can load the container 300 housing a reagent that reacts with a sample, in response to a first operation of moving the mechanical unit 11. The control unit 50 can control the measurement unit 40 to start measurement based on information 410 read by the reader 30, in response to detection of a second operation of moving the mechanical unit 11. The first operation is an operation of moving the mechanical unit 11 to set the load section 20 enable to load the container 300, while the second operation is an operation of moving the mechanical unit 11 to set a measurable state using the container 300.

The first and second operations are, for example, the operation of moving the same mechanical unit 11. When the first and second operation is the operation of moving the same mechanical unit 11, for example, the first operation is an operation of switching the mechanical unit 11 from a first state, such as OFF state for example, to a second state, such as ON state for example, while the second operation is an operation of returning the mechanical unit 11 from the second state to the first state. The first and second states may be an open state and a closed state of the lid, respectively, for example. Moreover, for example, the first and second operations are operations of moving the separately provided mechanical units 11. The first and second operations may be the same operation.

The user performs the first operation to load the container 300 in the load section 20. In the example of FIG. 21, the first operation is an operation of pressing the operation unit 103. In response to detection of the pressing of the operation unit 103, the lid 102 is opened. The user loads the container 300 in the load section 20 opened by the first operation. The user performs the second operation to set a measurable state using the container 300 loaded in the load section 20. In the example of FIG. 21, the second operation is an operation of closing the opened lid 102. Once the second operation is performed, the control unit 50 starts measurement by the measurement unit 40.

In a second embodiment, the information storage part 400 and the container 300 may be separately provided. In this case, even if the container 300 is not loaded in the load section 20, the information 410 can be read at anytime as long as the information storage part 400 is loaded at a read position for the reader 30. Thus, in a second embodiment, the reader 30 does not necessarily read the information 410 in response to detection of the first operation or the second operation.

In a second embodiment as described above, with the above configuration, when the user performs the first operation while setting the container 300 in the load section 20 and then performs the second operation, information reading and measurement are started. More specifically, the user naturally executes the first and second operations during the course of a series of operations performed to start the measurement by setting the container 300 in the load section 20. As a result, the measurement can be started after setting the measurable state by surely loading the container 300, without complicating the input operation. Therefore, the user can start the measurement without performing a cumbersome operation of a user interface on a display screen just by loading the container 300 and setting the measurable state. Thus, the measurement can be started with a simpler operation.

In the example of FIG. 21, the sample measurement device 700 includes more than one device main body 710. The terminal 500 can receive measurement results from the device main bodies 710 and display the device main bodies 710 with the measurement results obtained in such a manner that the device main bodies 710 are differentiated from each other on the display screen 510. Thus, the respective measurement results from the device main bodies 710 can be managed in an integrated manner by the terminal 500. Unlike a case where several pairs of the device main bodies 710 and the terminals 500 are provided, the device main bodies 710 can be handled with one terminal 500. Thus, the entire device configuration can be simplified, and handling by the user can be facilitated.

For example, the terminal 500 receives a device ID for identifying the individual device main body 710 and the measurement result data from each of the device main bodies 710. The measurement result data includes the measurement item, measurement result, container ID of the used container 300, measurement execution date and time of measurement, and the like.

Upon acquisition of the measurement result data from the device main body 710, the terminal 500 displays the measurement result data in a display field for each device main body 710, which is differentiated by the device ID, on a measurement result screen 520, as illustrated in FIG. 22.

In an example illustrated in FIG. 23, the terminal 500 displays user interfaces 511 for information input on the display screen 510. For example, the user interface 511 displays buttons for inputting an instruction to read information by the reader 30 to the device main body 710. The user interface 511 also displays buttons for displaying the measurement result screen 520 illustrated in FIG. 22. The user interface 511 displays buttons for performing various kinds of settings to the terminal 500 and various kinds of information input to the device main body 710. The information to be inputted is, for example, subject-related information. More specifically, information on a subject from whom a sample injected into the container 300 is collected can be inputted in the terminal 500. The subject information may include subject specifying information such as a patient ID, name, sex, age, height, weight, and the like.

Thus, at least the function to execute the measurement operation can be completed only on the device main body 710 side by moving the mechanical unit 11. Other information input can be performed on the terminal 500 side. Therefore, the user can perform the operation of measuring the sample through a simple operation to the device main body 710, and can use the terminal 500 to flexibly perform information input operations and the like other than the measurement. Thus, the user-friendliness of the device can be further improved.

The information to be inputted may include selection between the first and second modes illustrated in FIGS. 17A and 17B. Moreover, the user interface 511 may display buttons to input an instruction to start measurement by specifying the device main body 710. More specifically, in the sample measurement device 700, each device main body 710 may be configured to additionally receive an instruction to start a measurement operation from the terminal 500, based on the configuration in which the measurement operation is started in response to detection of the second operation of moving the mechanical unit 11.

The other configuration and advantageous effects of a second embodiment are the same as those of a first embodiment.

(Modified Example of Second Operation)

Figure 24:
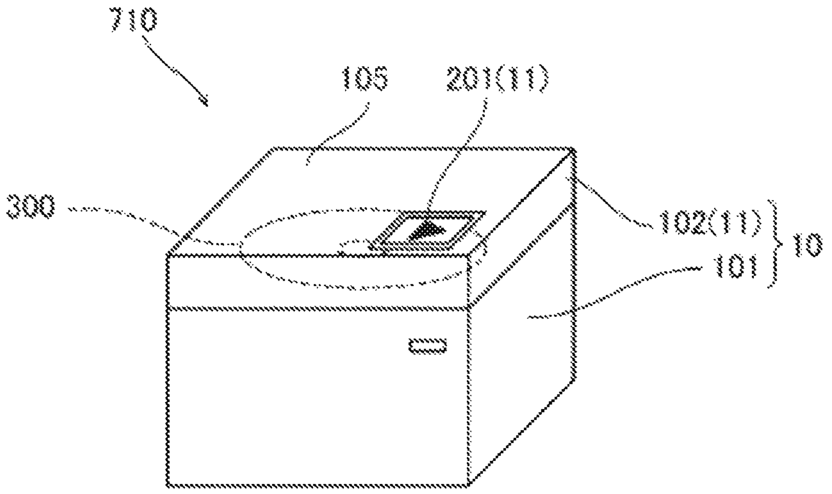
FIG. 24 is a perspective view illustrating an operation unit to start measurement in the sample measurement device.

Although FIG. 21 illustrates the example where the second operation is the operation of closing the lid 102, FIG. 24 illustrates an example where the second operation is an input operation to an operation unit 201.

In the example of FIG. 24, the mechanical unit 11 includes an operation unit 201 that receives an input operation. The operation unit 201 includes a button provided in an upper surface part 105 of the lid 102. The second operation includes an input operation to the operation unit 201. The control unit 50 is electrically connected to the operation unit 201, and detects a pressing input operation to the operation unit 201. As the second operation, the control unit 50 controls the measurement unit 40 to start measurement based on information 410 read by the reader 30, in response to detection that the operation unit 201 is pressed. More specifically, in the example of FIG. 24, the operation unit 201 corresponds to a start button to start the measurement operation. Thus, unlike a case where an operation is executed by performing input operation on a display screen, a user executes the operation by directly moving the operation unit 201. Accordingly, operation mistakes can be suppressed. In the example of FIG. 24, the operation unit 103 to open the lid 102 does not have to be provided. In this case, the user can open the lid 102 by directly holding the lid 102. In FIG. 24, the operation unit 103 to open the lid 102 and the operation unit 201 as the start button to start the measurement operation may both be provided.

(Modified Example of Information Storage Part)

Figure 25:
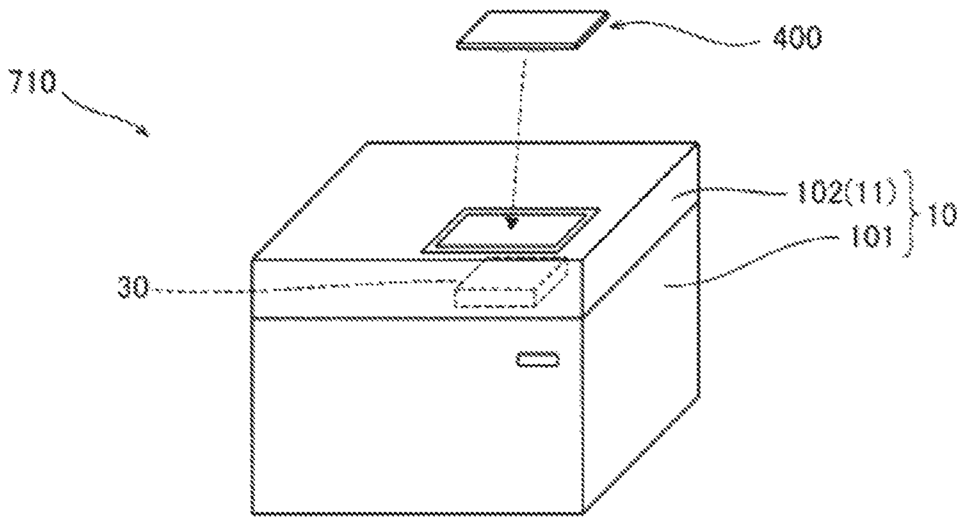
FIG. 25 is a diagram illustrating an example where the information storage part is an RF tag.

Although FIG. 21 illustrates the example where the container 300 is provided with the information storage part 400, FIG. 25 illustrates an example where the information storage part 400 and the container 300 are separately provided. The information storage part 400 is a card-type medium with an RF tag provided thereon, and information 410 can be read through near field radio communication. The reader 30 is an RF tag reader that reads information through near field radio communication. For example, the reader 30 is installed in the lid 102 of the housing 10, and reads the information 410 from the information storage part 400 provided at a read position in the upper surface part 105 of the lid 102.

Note that the embodiments disclosed herein should be considered in all respects illustrative and not restrictive. The scope of the disclosure is not defined by the above description of the embodiments but by the scope of claims, and includes equivalent meanings to the claims and all modifications within the scope.

The invention claimed is:

1. A sample measuring method of optically measuring a sample housed in a container in a sample measurement device, the method comprising:

loading, in the sample measurement device, the container such that the container is shielded from light;

starting to read, from the container, information regarding a measurement to be performed on the sample in response to loading the container, wherein the information includes reagent-related information comprising information specifying a measurement item for the sample;

transmitting the information read from the container to a terminal or a server;

acquiring a calibration curve of the measurement item from the terminal or the server;

measuring the sample in the loaded light-shielded container, based on the measurement item and the calibration curve; and suspending to start the measurement of the sample until the information is acquired from the container.

2. The sample measuring method according to claim 1, wherein loading the container comprises:

opening a lid of the sample measurement device to place the container, and closing the lid so that the container is shielded from light, and wherein starting to read the information is performed in response to closing the lid.

3. The sample measuring method according to claim 1, wherein loading the container comprises:

ejecting a tray of the sample measurement device to place the container, and closing the tray in the sample measurement device so that the container is shielded from light, and wherein starting to read the information is performed in response to closing the tray.

4. The sample measuring method according to claim 1, wherein loading the container comprises:

inserting the container into an opening in the sample measurement device, and taking the container into a housing of the sample measurement device through the opening so that the container is shielded from light, and wherein starting to read the information is performed in response to taking the container into the housing.

5. The sample measuring method according to claim 1, wherein the information comprises information on the sample.

6. The sample measuring method according to claim 5, wherein the information on the sample includes information specifying the container.

7. The sample measuring method according to claim 5, wherein the information on the sample includes information identifying the sample.

8. The sample measuring method according to claim 1, further comprising opening the lid to allow the container to be loaded, in response to an operation of a mechanical unit provided in the sample measurement device.

9. The sample measuring method according to claim 1, wherein the container contains reagent, and wherein the information comprises a lot number of the reagent.

10. A sample measurement device that optically measures a sample housed in a container, comprising:

a housing;

a load section that enables loading of the container and comprising a mechanical unit that is movable for enabling the container loaded by the load section to be shielded from light, wherein the mechanical unit includes an openable and closable lid that covers the load section;

a reader that starts to read information from the container regarding a measurement to be performed on the sample in response to loading the container;

a communication unit comprising a transmitter and a receiver, the communication unit configured to:

transmit the information read from the container to a terminal or a server; and acquire a calibration curve of the measurement item from the terminal or the server;

a measurement unit that measures the sample in the loaded light-shielded container based on the measurement item and the calibration curve; and an operation unit that provides an operation to the mechanical unit to mechanically move the mechanical unit such that the load section is ready for loading of the container, wherein the lid arranged in the housing is opened through the operation of the operation unit.

11. The sample measurement device according to claim 10, further comprising a detecting unit that detects closing of the lid.

12. A sample measuring method of optically measuring a sample housed in a container in a sample measurement device, the method comprising:

loading, in the sample measurement device, the container such that the container is shielded from light;

starting to read, from the container, information regarding a measurement to be performed on the sample in response to loading the container, wherein the information includes reagent-related information comprising information specifying a measurement item for the sample;

transmitting the information read from the container to a terminal or a server;

acquiring a calibration curve of the measurement item from the terminal or the server; and measuring the sample in the loaded light-shielded container, based on the measurement item and the calibration curve, wherein loading the container comprises:

opening a lid of the sample measurement device to allow the container to be loaded; and closing the lid so that the container is shielded from light, wherein starting to read the information is executed in response to closing the lid, and wherein opening the lid to allow the container to be loaded is executed in response to an operation of a mechanical unit provided in the sample measurement device.

13. A sample measurement device that optically measures a sample housed in a container, comprising:

a housing;

a load section that enables loading of the container and comprising a mechanical unit that is movable for enabling the container loaded by the load section to be shielded from light, wherein the mechanical unit includes an openable and closable lid that covers the load section;

a reader that starts to read information from the container regarding a measurement to be performed on the sample in response to loading the container;

a communication unit comprising a transmitter and a receiver, the communication unit configured to:

transmit the information read from the container to a terminal or a server; and acquire a calibration curve of the measurement item from the terminal or the server;

a measurement unit that measures the sample in the loaded light-shielded container based on the measurement item and the calibration curve; wherein the load section is positioned in an upper surface part of a main body unit of the sample measurement device, and the lid is provided to be turnable relative to the main body unit so as to cover the upper surface part of the main body unit.

* * * * *